United States Patent
Yamada

(10) Patent No.: US 8,509,500 B2
(45) Date of Patent: Aug. 13, 2013

(54) FINGERPRINT AUTHENTICATION DEVICE, FINGERPRINT AUTHENTICATION PROGRAM, AND FINGERPRINT AUTHENTICATION METHOD

(75) Inventor: Shigefumi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 947 days.

(21) Appl. No.: 12/461,427

(22) Filed: Aug. 11, 2009

(65) Prior Publication Data

US 2010/0061602 A1 Mar. 11, 2010

(30) Foreign Application Priority Data

Sep. 5, 2008 (JP) .................................. 2008-228983

(51) Int. Cl.
*G06K 9/00* (2006.01)
(52) U.S. Cl.
USPC ............................ 382/124; 382/190; 382/218
(58) Field of Classification Search
USPC .......................................... 382/124, 190, 218
See application file for complete search history.

(56) References Cited

U.S. PATENT DOCUMENTS

| 5,828,773 | A | 10/1998 | Setlak et al. | |
|---|---|---|---|---|
| 6,983,061 | B2 * | 1/2006 | Ikegami et al. | 382/115 |
| 7,110,579 | B2 * | 9/2006 | Hashimoto | 382/124 |
| 7,636,458 | B2 * | 12/2009 | Matsuda et al. | 382/124 |
| 2002/0120592 | A1 * | 8/2002 | Juels et al. | 706/8 |
| 2003/0123714 | A1 * | 7/2003 | O'Gorman et al. | 382/124 |
| 2005/0129290 | A1 | 6/2005 | Lo et al. | |
| 2007/0036400 | A1 * | 2/2007 | Watanabe et al. | 382/124 |
| 2007/0047771 | A1 * | 3/2007 | Watanabe et al. | 382/115 |
| 2009/0046904 | A1 * | 2/2009 | Moon et al. | 382/124 |
| 2009/0169072 | A1 * | 7/2009 | Lo et al. | 382/125 |
| 2010/0061602 | A1 * | 3/2010 | Yamada | 382/124 |

FOREIGN PATENT DOCUMENTS

| EP | 1 826 707 A2 | 8/2007 |
|---|---|---|
| JP | 63-245782 | 10/1988 |
| JP | 8-161491 | 6/1996 |
| JP | 8-185517 | 7/1996 |
| JP | 2003-67750 | 3/2003 |
| JP | 2003-296717 | 10/2003 |
| JP | 2005-235067 | 9/2005 |

(Continued)

OTHER PUBLICATIONS

European Search Repot dated Nov. 23, 2009 and issued in corresponding European Patent Application 09010333.4.

(Continued)

*Primary Examiner* — Gregory M Desire
(74) *Attorney, Agent, or Firm* — Staas & Halsey LLP

(57) ABSTRACT

It is judged whether a fingerprint authentication process has successfully been performed, based on a result obtained by comparing input fingerprint information generated from a fingerprint image input through a fingerprint sensor with registered fingerprint information registered in advance. In the case where a result indicating that the authentication process has failed has been obtained, an overlapping area size corresponding to the time when the input fingerprint information and the registered fingerprint information overlap each other the most is obtained. By using the overlapping area size and a similarity level indicating a matching degree between the input fingerprint information and the registered fingerprint information corresponding to the time when these images overlap each other the most, it is judged whether a re-input of an input fingerprint image should be requested. In the case where the judgment result is in the affirmative, the re-input of an input fingerprint image will be requested.

17 Claims, 16 Drawing Sheets

(56) References Cited

FOREIGN PATENT DOCUMENTS

| | | |
|---|---|---|
| JP | 2006-99374 | 4/2006 |
| JP | 2007-047931 | 2/2007 |
| WO | 02/077907 A1 | 10/2002 |

OTHER PUBLICATIONS

Japanese Office Action mailed Jan. 22, 2013 issued in corresponding Japanese Patent Application No. 2008-228983.

* cited by examiner

FIG.1A

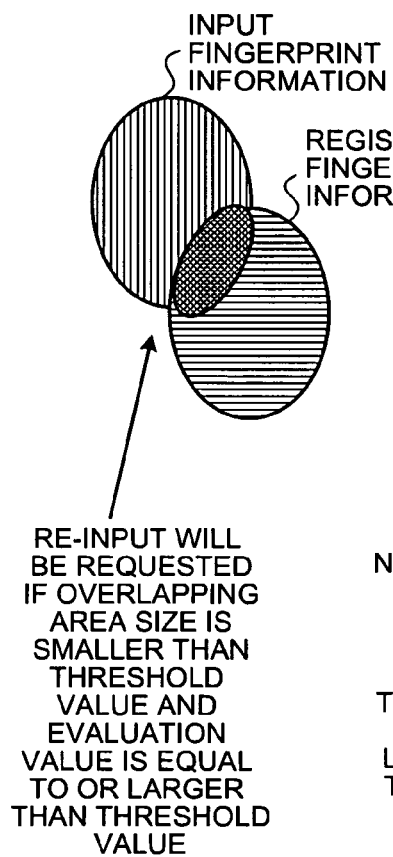

INPUT
FINGERPRINT
INFORMATION

REGISTERED
FINGERPRINT
INFORMATION

RE-INPUT WILL
BE REQUESTED
IF OVERLAPPING
AREA SIZE IS
SMALLER THAN
THRESHOLD
VALUE AND
EVALUATION
VALUE IS EQUAL
TO OR LARGER
THAN THRESHOLD
VALUE

FIG.1B

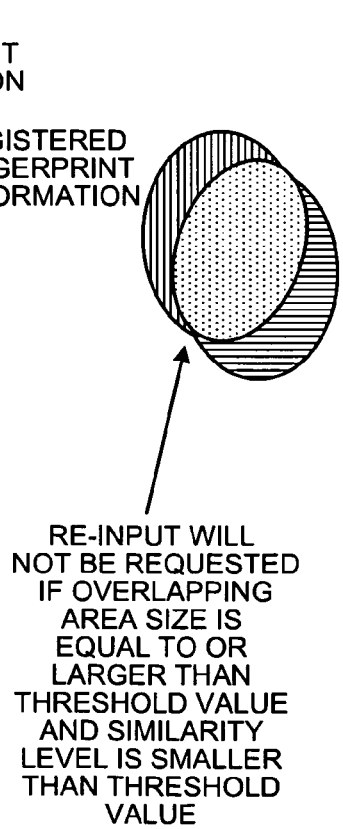

RE-INPUT WILL
NOT BE REQUESTED
IF OVERLAPPING
AREA SIZE IS
EQUAL TO OR
LARGER THAN
THRESHOLD VALUE
AND SIMILARITY
LEVEL IS SMALLER
THAN THRESHOLD
VALUE

FIG.1C

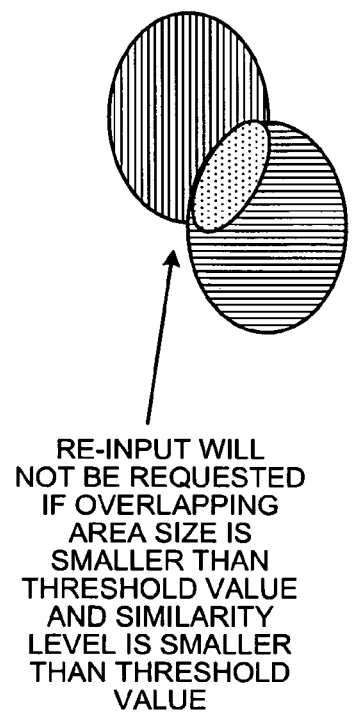

RE-INPUT WILL
NOT BE REQUESTED
IF OVERLAPPING
AREA SIZE IS
SMALLER THAN
THRESHOLD VALUE
AND SIMILARITY
LEVEL IS SMALLER
THAN THRESHOLD
VALUE

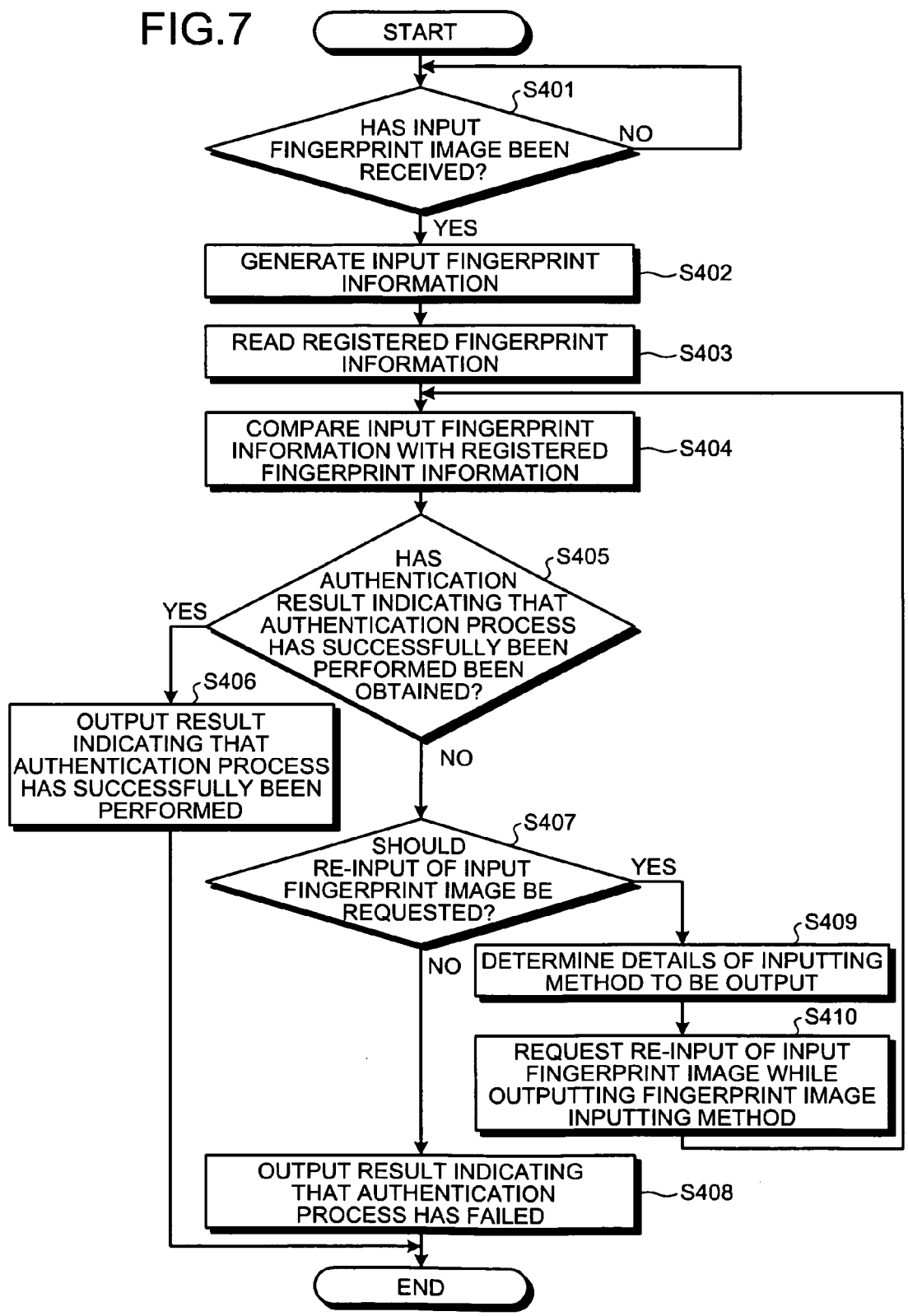

WHEN SENSOR SURFACE WAS SWEPT
WHILE FINGER WAS LAID FLAT

WHEN SENSOR SURFACE WAS SWEPT
WHILE FINGER WAS RAISED UPRIGHT

SWEEP SENSOR        SWEEP SENSOR
           SURFACE WHILE FINGER  SURFACE WHILE FINGER
             IS RAISED UPRIGHT      IS LAID FLAT

VIEW FROM SIDE    TO MOVE UPWARD    TO MOVE DOWNWARD

FIG.15

| TIME OF AUTHEN-TICATION | NUMBER OF TIMES INPUT WAS REQUIRED IN EACH AUTHENTICATION PROCESS | DISPLACEMENT AMOUNT IN UP-AND-DOWN DIRECTION | DISPLACEMENT AMOUNT IN LEFT-AND-RIGHT DIRECTION | ROTA-TION ANGLE | OVERLAPPING AREA SIZE | AUTHEN-TICATION RESULT |
|---|---|---|---|---|---|---|
| 200x/1/27 9:00 | 1 | 1 mm | 2 mm | 0 | 100 mm | SUCCESSFUL |
| 200x/1/28 9:00 | 1 | 10 mm | 3 mm | 1 | 40 mm | FAILED |
| 200x/1/28 9:00 | 2 | 2 mm | 2 mm | 1 | 90 mm | SUCCESSFUL |
| 200x/1/30 9:00 | 2 | 13 mm | 10 mm | 3 | 30 mm | FAILED |

FINGERPRINT AUTHENTICATION DEVICE, FINGERPRINT AUTHENTICATION PROGRAM, AND FINGERPRINT AUTHENTICATION METHOD

CROSS-REFERENCE TO RELATED APPLICATION

This application is based upon and claims the benefit of priority of the prior Japanese Patent Application No. 2008-228983, filed on Sep. 5, 2008, the entire contents of which are incorporated herein by reference.

FIELD

The embodiments discussed herein are directed to a fingerprint authentication device, a fingerprint authentication program, and a fingerprint authentication method for, in the case where an authentication result indicating that a fingerprint authentication process has failed has been obtained, requesting a corresponding user to re-input a fingerprint image.

BACKGROUND

A fingerprint authentication device that, in the case where an authentication result indicating that a fingerprint authentication process has failed has been obtained, requests a corresponding user to re-input a fingerprint image has conventionally been known (see, for example, Japanese Laid-open Patent Publication No. 2003-296717).

More specifically, the conventional fingerprint authentication device judges whether the fingerprint authentication process has successfully been performed, based on a comparison result obtained by comparing input fingerprint information generated from a fingerprint image that has been input through a fingerprint sensor with registered fingerprint information that has been registered in advance. In this situation, in the case where an authentication result indicating that the authentication process has failed has been obtained, the fingerprint authentication device requests the user to re-input a fingerprint image, except in the situation where the input fingerprint information and the registered fingerprint information do not overlap each other at all.

A problem with the conventional fingerprint authentication device, however, is that the fingerprint authentication device requires more time and effort from the user during the fingerprint authentication process by requesting the user to re-input a fingerprint image in vain. In other words, even in a situation where the re-input of a fingerprint image will fail to bring out an authentication result indicating that the authentication process has successfully been performed, the conventional fingerprint authentication device requests the user to re-input a fingerprint image and requires more time and effort from the user during the fingerprint authentication process.

SUMMARY

According to an aspect of an embodiment of the present invention, a fingerprint authentication device includes an authentication success/failure judging unit that judges whether a fingerprint authentication process has successfully been performed, based on a comparison result obtained by comparing input fingerprint information generated from a fingerprint image input through a fingerprint sensor with registered fingerprint information registered in advance; an overlapping area size obtaining unit that, in a case where the authentication success/failure judging unit has obtained an authentication result indicating that the fingerprint authentication process has failed, obtains an overlapping area size corresponding to a time when the input fingerprint information and the registered fingerprint information overlap each other the most; a requestability judging unit that judges whether a re-input of the input fingerprint image is to be requested, by using the overlapping area size obtained by the overlapping area size obtaining unit and a similarity level that indicates a matching degree between the input fingerprint information and the registered fingerprint information corresponding to the time when the input fingerprint information and the registered fingerprint information overlap each other the most; and a re-input requesting unit that requests the re-input of the input fingerprint image in a case where the requestability judging unit has obtained a judgment result indicating that the re-input of the input fingerprint image is to be requested.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A to 1C are drawings for explaining an overview of a fingerprint authentication device according to a first embodiment;

FIG. 7 is a flowchart for explaining a flow in processes performed by the fingerprint authentication device according to the third embodiment;

FIG. 15 is a drawing for explaining examples of history records stored in the fingerprint authentication device.

DESCRIPTION OF EMBODIMENTS

Figure 2:
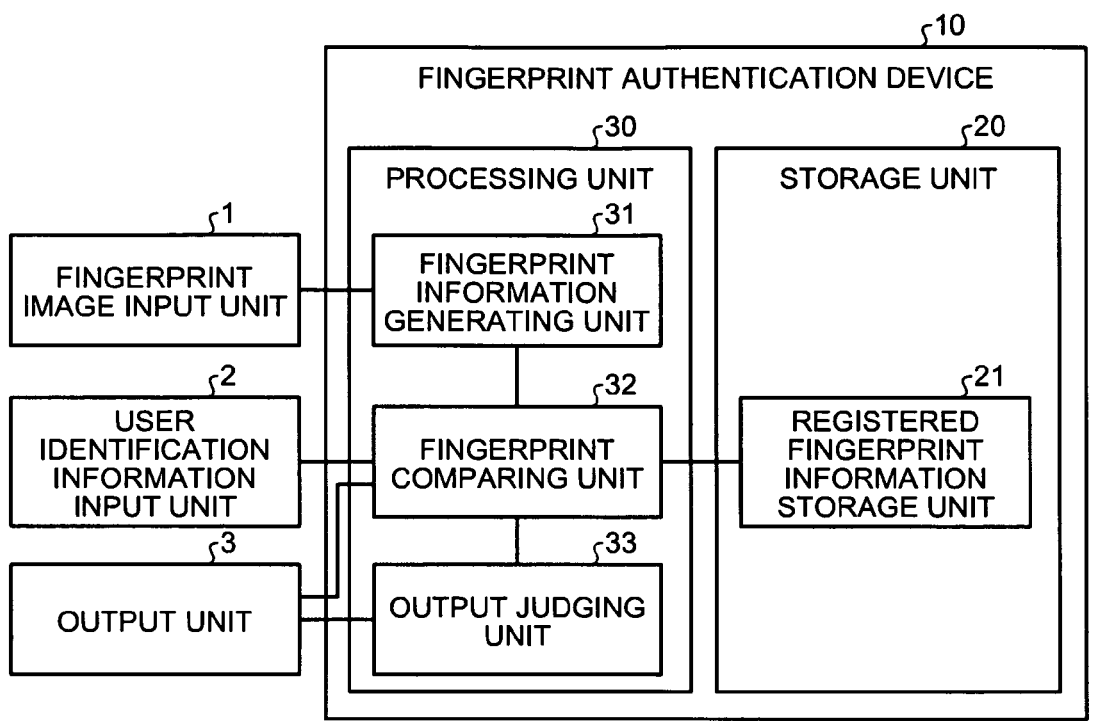
FIG. 2 is a block diagram of the fingerprint authentication device.

Exemplary embodiments of a fingerprint authentication device, a fingerprint authentication program, and a fingerprint authentication method according to the present invention will be explained in detail, with reference to the accompanying drawings. In the following sections, examples in which the present invention is applied to a fingerprint authentication device will be explained.

In the description of a first embodiment of the present invention below, a fingerprint authentication device according to the first embodiment that judges whether a fingerprint authentication process has successfully been performed by using a so-called pattern matching method will be explained. An overview of the fingerprint authentication device, a configuration of the fingerprint authentication device, and a flow in the processes performed by the fingerprint authentication device will be explained, followed by a description of an advantageous effect of the first embodiment.

First, an overview of the fingerprint authentication device according to the first embodiment will be explained, with reference to FIGS. 1A to 1C. FIGS. 1A to 1C are drawings for explaining the overview of the fingerprint authentication device according to the first embodiment.

The overview of the fingerprint authentication device according to the first embodiment can be summarized as follows: In the case where an authentication result indicating that an authentication process has failed has been obtained by using the pattern matching method, the fingerprint authentication device requests the user to re-input a fingerprint image. In particular, the fingerprint authentication device is able to reduce the time and effort required from the user during the fingerprint authentication process by preventing the situation where the user is requested to re-input a fingerprint image in vain.

More specifically, the fingerprint authentication device according to the first embodiment calculates, for each displacement amount that is used for identifying an image area in a comparing process, the size of the area in which input fingerprint information and registered fingerprint information overlap each other and an evaluation value indicating a matching degree within the overlapping area, while keeping the overlapping area size and the evaluation value in correspondence with each other.

Subsequently, of all the displacement amounts, in the case where there is no displacement amount for which the size of the area (hereinafter, the "area size") is equal to or larger than a threshold value, and also, the evaluation value is equal to or larger than a threshold value, the fingerprint authentication device judges that the fingerprint authentication process has failed.

In this situation, the fingerprint authentication device obtains the area size corresponding to the displacement amount having the highest evaluation value, as an overlapping area size. The fingerprint authentication device then judges that the fingerprint authentication device should request the user to re-input an input fingerprint image on the condition that the overlapping area size is smaller than a threshold value, and also, the highest evaluation value satisfies a predetermined threshold value.

After that, in the case where a judgment result indicating that the fingerprint authentication device should request the user to re-input an input fingerprint image has been obtained, the fingerprint authentication device requests the user to re-input an input fingerprint image.

In other words, as depicted in FIG. 1A, the fingerprint authentication device requests the user to re-input an input fingerprint image, on the condition that the overlapping area size corresponding to the time when the input fingerprint information and the registered fingerprint information overlap each other the most is smaller than the predetermined threshold value, and also, the evaluation value satisfies the predetermined threshold value.

In contrast, as depicted in FIG. 1B, the fingerprint authentication device does not request the user to re-input an input fingerprint image, in the case where the overlapping area size corresponding to the time when the input fingerprint information and the registered fingerprint information overlap each other the most is equal to or larger than the predetermined threshold value, and also, the evaluation value does not satisfy the predetermined threshold value.

Further, as depicted in FIG. 1C, the fingerprint authentication device does not request the user to re-input an input fingerprint image, also in the case where the overlapping area size corresponding to the time when the input fingerprint information and the registered fingerprint information overlap each other the most is smaller than the predetermined threshold value, and also, the evaluation value does not satisfy the predetermined threshold value.

With these arrangements, the fingerprint authentication device according to the first embodiment is able to reduce the time and effort required from the user during the fingerprint authentication process by preventing the situation where the user is requested to re-input a fingerprint image in vain.

Next, a configuration of the fingerprint authentication device explained with reference to FIGS. 1A to 1C will be explained, with reference to FIG. 2. FIG. 2 is a block diagram of the fingerprint authentication device according to the first embodiment. As depicted in FIG. 2, a fingerprint authentication device 10 is connected to a fingerprint image input unit 1, a user identification information input unit 2, and an output unit 3 and is configured so as to include a storage unit 20 and a processing unit 30.

The fingerprint image input unit 1 inputs an input fingerprint image to the fingerprint authentication device 10. More specifically, the fingerprint image input unit 1 corresponds to a fingerprint sensor. For example, when having received an operation for inputting a fingerprint image, the fingerprint image input unit 1 captures the fingerprint image and inputs the input fingerprint image to the fingerprint authentication device 10.

The user identification information input unit 2 receives an input of various types of information related to the fingerprint authentication process. More specifically, the user identification information input unit 2 corresponds to one or more operational buttons and/or a keyboard. The user identification information input unit 2 receives a user ID that is used for uniquely identifying a user and inputs the received user ID to the fingerprint authentication device 10.

The output unit 3 outputs various types of information related to the fingerprint authentication process to the user. More specifically, the output unit 3 includes a monitor (or a display device, or a touch panel) and a speaker. The output unit 3 outputs, for example, a message indicating whether the fingerprint authentication process has successfully been performed.

The storage unit 20 stores therein data and computer programs that are required in various types of processes performed by the processing unit 30. In particular, as an element that is closely related to the first embodiment, the storage unit 20 includes a registered fingerprint information storage unit 21.

The registered fingerprint information storage unit 21 stores therein the registered fingerprint information that has been registered as a fingerprint with which the input fingerprint information is to be compared. More specifically, for each user, the registered fingerprint information storage unit 21 stores therein registered fingerprint information and a user ID while keeping them in correspondence with each other, the registered fingerprint information being obtained by applying an image processing procedure to the registered fingerprint image so as to convert the registered fingerprint image into information used in the fingerprint authentication process.

The processing unit 30 includes an internal memory for storing therein a controlling computer program, other computer programs that define various types of processing procedures as well as relevant data and performs various types of processes by using the stored computer programs and data. In particular, as a component that is closely related to the first embodiment, the processing unit 30 includes a fingerprint information generating unit 31, a fingerprint comparing unit 32, and an output judging unit 33.

The fingerprint comparing unit 32 may also be referred to as an authentication success/failure judging unit. In addition, the output judging unit 33 may also be referred to as an overlapping area size obtaining unit, a requestability judging unit, and a re-input requesting unit.

When having received the input fingerprint image from the fingerprint image input unit 1, the fingerprint information generating unit 31 generates input fingerprint information by applying an image processing procedure to the input fingerprint image so as to convert the input fingerprint image into information used in the fingerprint authentication process. The fingerprint information generating unit 31 then inputs the generated input fingerprint information to the fingerprint comparing unit 32. For example, the fingerprint information generating unit 31 generates the input fingerprint information by extracting a region of the input fingerprint image that is recognized as a fingerprint and inputs the generated input fingerprint information to the fingerprint comparing unit 32.

The fingerprint comparing unit 32 judges whether the fingerprint authentication process has successfully been performed, based on a comparison result obtained by comparing the input fingerprint information with the registered fingerprint information that has been registered in advance. More specifically, when the fingerprint comparing unit 32 has received the input fingerprint information from the fingerprint information generating unit 31 and has received the user ID from the user identification information input unit 2, the fingerprint comparing unit 32 reads the registered fingerprint information corresponding to the user ID from the registered fingerprint information storage unit 21.

Subsequently, for each displacement amount that is used for identifying an image area used in the comparing process, the fingerprint comparing unit 32 calculates the number of matching pixels each of which has both a matching pixel position and a matching pixel level between the overlapping area within the input fingerprint information and the overlapping area within the registered fingerprint information.

After that, for each displacement amount, the fingerprint comparing unit 32 calculates an evaluation value indicating a ratio of the number of matching pixels to the overlapping area size (i.e., the total number of pixels contained in the overlapping area). It is possible to calculate an evaluation value "s(x,y)" corresponding to a displacement amount "(x,y)" by using Expression (1) depicted below in which the input fingerprint information is expressed as "I(x,y)", whereas the registered fingerprint information is expressed as "T(x,y)". In Expression (1) below, "A" denotes the overlapping area size.

$$s(x, y) = \frac{1}{A} \sum \sum I(x, y) T(i - x, i - y) \qquad (1)$$

After that, from among all the displacement amounts, the fingerprint comparing unit 32 selects displacement amounts each of which corresponds to an area size that is equal to or larger than a specified area size "β1" used for judging whether the fingerprint authentication process has successfully been performed. In this situation, the fingerprint comparing unit 32 specifies the evaluation value that is the highest of the evaluation values respectively corresponding to the selected displacement amounts as a similarity level, which indicates the matching degree between the input fingerprint information and the registered fingerprint information. Subsequently, the fingerprint comparing unit 32 judges whether the fingerprint authentication process has successfully been performed by comparing the similarity level with a specified threshold value "α1" used for judging whether the fingerprint authentication process has successfully been performed.

In this situation, in the case where the similarity level satisfies the specified threshold value "α1", the fingerprint comparing unit 32 judges that the fingerprint authentication process has successfully been performed and outputs a result indicating that the fingerprint authentication process has successfully been performed to the user, via the output unit 3. On the contrary, in the case where the similarity level does not satisfy the specified threshold value "α1", the fingerprint comparing unit 32 judges that the fingerprint authentication process has failed.

In the case where the fingerprint comparing unit 32 has obtained the authentication result indicating that the authentication process has failed, the output judging unit 33 obtains an overlapping area size corresponding to the time when the input fingerprint information and the registered fingerprint information overlap each other the most. After that, the output judging unit 33 judges whether the fingerprint authentication device should request the user to re-input an input fingerprint image by using the obtained overlapping area size and the similarity level indicating the matching degree between the input fingerprint information and the registered fingerprint information corresponding to the time when the input fingerprint information and the registered fingerprint information overlap each other the most. After that, in the case where a judgment result indicating that the fingerprint authentication device should request the user to re-input an input fingerprint image has been obtained, the output judging unit 33 requests the user to re-input an input fingerprint image.

More specifically, the output judging unit 33 obtains the size of such an area in which the input fingerprint information and the registered fingerprint information overlap each other that corresponds to the time when the evaluation value is the highest, the evaluation value being a value that correlates with the similarity level when the pattern matching method is used. After that, the output judging unit 33 judges that the fingerprint authentication device should request the user to re-input an input fingerprint image on the condition that the overlapping area size is smaller than the predetermined threshold value, and also, the evaluation value corresponding to the time when the two images overlap each other the most satisfies the predetermined threshold value.

Even more specifically, in the case where the fingerprint comparing unit 32 has obtained the authentication result indicating that the authentication process has failed, the output judging unit 33 selects one of the displacement amounts that corresponds to the time when the input fingerprint information and the registered fingerprint information overlap each other the most (i.e., when the evaluation value is the highest). After that, the output judging unit 33 obtains the overlapping area size corresponding to the selected displacement amount and compares the obtained overlapping area size with the specified area size "$\beta 1$".

In this situation, in the case where the obtained overlapping area size is equal to or larger than the specified area size "$\beta 1$", the output judging unit 33 outputs a result indicating that the fingerprint authentication process has failed to the user, via the output unit 3. On the contrary, in the case where the obtained overlapping area size is smaller than the specified area size "$\beta 1$", the output judging unit 33 further judges whether the evaluation value corresponding to the selected displacement amount satisfies the specified threshold value "$\alpha 1$".

In this situation, in the case where a judgment result indicating that the evaluation value corresponding to the selected displacement amount satisfies the specified threshold value "$\alpha 1$" has been obtained, the output judging unit 33 judges that the fingerprint authentication device should request the user to re-input an input fingerprint image and requests the user to re-input an input fingerprint image, via the output unit 3.

On the contrary, in the case where a judgment result indicating that the evaluation value corresponding to the selected displacement amount does not satisfy the specified threshold value "$\alpha 1$" has been obtained, the output judging unit 33 judges that the fingerprint authentication device should not request the user to re-input an input fingerprint image and outputs a result indicating that the fingerprint authentication process has failed to the user, via the output unit 3.

Figure 3:
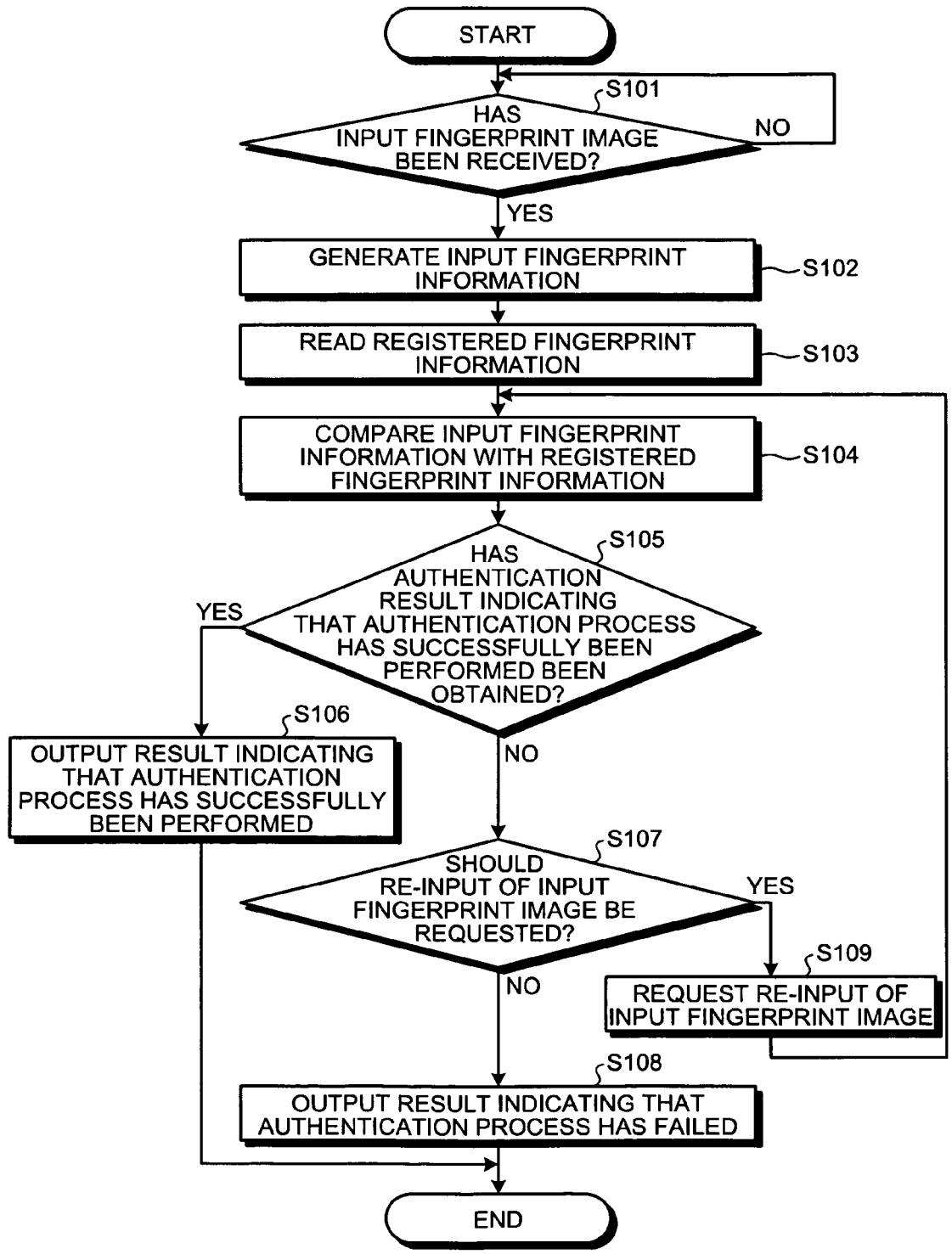
FIG. 3 is a flowchart for explaining a flow in processes performed by the fingerprint authentication device.
Figure 4:
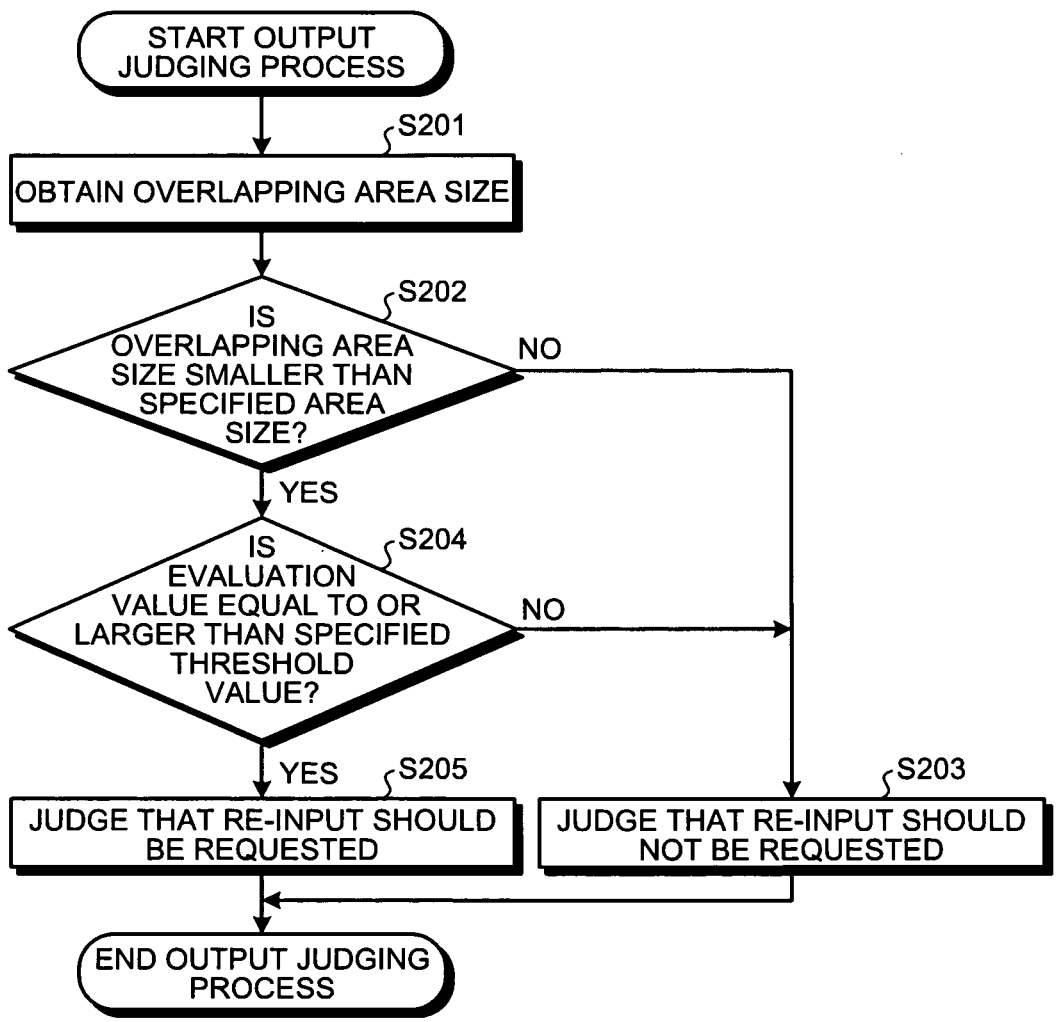
FIG. 4 is a flowchart for explaining a flow in an output judging process performed by the fingerprint authentication device.

Next, processes performed by the fingerprint authentication device 10 will be explained, with reference to FIGS. 3 and 4. FIG. 3 is a flowchart for explaining a flow in the processes performed by the fingerprint authentication device. FIG. 4 is a flowchart for explaining a flow in an output judging process performed by the fingerprint authentication device.

As depicted in FIG. 3, when the fingerprint information generating unit 31 has received an input fingerprint image (Yes at Step S101), the fingerprint information generating unit 31 generates input fingerprint information from the input fingerprint image (Step S102). When the fingerprint comparing unit 32 has received a user ID, the fingerprint comparing unit 32 reads the registered fingerprint information corresponding to the received user ID (Step S103).

After that, the fingerprint comparing unit 32 compares the input fingerprint information with the registered fingerprint information (Step S104) and judges whether a fingerprint authentication process has successfully been performed, based on a comparison result (Step S105).

In this situation, in the case where an authentication result indicating that the authentication process has successfully been performed has been obtained (Yes at Step S105), the fingerprint comparing unit 32 outputs a result indicating that the fingerprint authentication process has successfully been performed (Step S106) and ends the process.

On the contrary, in the case where an authentication result indicating that the authentication process has failed has been obtained (No at Step S105), the output judging unit 33 judges whether the fingerprint authentication device should request the user to re-input an input fingerprint image (Step S107).

In this situation, in the case where a judgment result indicating that the fingerprint authentication device should not request the user to re-input an input fingerprint image has been obtained (No at Step S107), the output judging unit 33 outputs a result indicating that the fingerprint authentication process has failed (Step S108), and ends the process.

On the contrary, in the case where a judgment result indicating that the fingerprint authentication device should request the user to re-input an input fingerprint image has been obtained (Yes at Step S107), the output judging unit 33 requests the user to re-input an input fingerprint image (Step S109). After that, the fingerprint comparing unit 32 compares input fingerprint information generated from the input fingerprint image that has been re-input with the registered fingerprint information again (Step S104).

As depicted in FIG. 4, when the output judging unit 33 has started a process (hereinafter, the "output judging process") to judge whether the fingerprint authentication device should request the user to re-input an input fingerprint image, the output judging unit 33 obtains the overlapping area size corresponding to the time when the input fingerprint information and the registered fingerprint information overlap each other the most (Step S201) and compares the obtained overlapping area size with the specified area size (Step S202).

In this situation, in the case where the overlapping area size is equal to or larger than the specified area size (No at Step S202), the output judging unit 33 judges that the fingerprint authentication device should not request the user to re-input an input fingerprint image (Step S203).

On the contrary, in the case where the overlapping area size is smaller than the specified area size (Yes at Step S202), the output judging unit 33 judges whether the evaluation value corresponding to the time when the input fingerprint information and the registered fingerprint information overlap each other the most satisfies the specified threshold value (Step S204).

In this situation, in the case where a judgment result indicating that the evaluation value satisfies the specified threshold value has been obtained (Yes at Step S204), the output judging unit 33 judges that the fingerprint authentication device should request the user to re-input an input fingerprint image (Step S205).

On the contrary, in the case where a judgment result indicating that the evaluation value does not satisfy the specified threshold value has been obtained (No at Step S204), the output judging unit 33 judges that the fingerprint authentication device should not request the user to re-input an input fingerprint image (Step S203).

As explained above, according to the first embodiment, the fingerprint authentication device is possible to reduce the time and effort request from the user during the fingerprint authentication process by preventing the situation where the user is requested to re-input a fingerprint image in vain. For example, according to the first embodiment, the fingerprint authentication device requests the user to re-input a fingerprint image only in the case where there is a high possibility that an authentication result indicating that the authentication process has successfully been performed will be obtained. As a result, it is possible to reduce the time and effort required from the user during the fingerprint authentication process by preventing the situation where the user is requested to re-input a fingerprint image in vain.

Another arrangement is acceptable in which the output judging unit 33 described above is configured so as to judge whether the area size of the registered fingerprint information itself is equal to or larger than the specified area size "$\beta 1$". In this situation, in the case where a judgment result indicating that the area size of the registered fingerprint information is smaller than the specified area size "β1" has been obtained, the output judging unit 33 outputs a result indicating that the fingerprint authentication process has failed to the user.

Yet another arrangement is acceptable in which the output judging unit 33 further specifies a minimum area size "β2" that is a threshold value used for eliminating a situation in which the overlapping area size is too much smaller than the specified area size. With this arrangement, in the case where the calculated overlapping area size is equal to or larger than the minimum area size "β2" and is smaller than the specified area size "β1", the output judging unit 33 judges whether the evaluation value corresponding to the selected displacement amount satisfies the specified threshold value "α1".

Further, in the case where the fingerprint comparing unit 32 has obtained an authentication result indicating that the authentication process has failed, it can be assumed that the overlapping area size corresponding to the displacement amount having the highest evaluation value is always smaller than the specified area size "β1". In such situations, the output judging unit 33 judges that the overlapping area size is naturally smaller than the specified area size (Yes at Step S202, in FIG. 4), the output judging unit 33 does not need to judge whether the overlapping area size is smaller than the predetermined threshold value.

In the description of the first embodiment above, the example is explained in which it is judged whether the fingerprint authentication process has successfully been performed by using the pattern matching method. However, the present invention is not limited to the example. It is possible to apply the present invention to another example in which it is judged whether a fingerprint authentication process has successfully been performed by using a minutia method (or a minutia-based method) by which the number of minutiae in the fingerprints that are contained in both input fingerprint information and registered fingerprint information in an overlapping manner is counted as a similarity level. Accordingly, as a second embodiment, the example will be explained in which the present invention is applied to the fingerprint authentication device 10 that judges whether a fingerprint authentication process has successfully been performed by using the minutia method. In the description of the second embodiment below, an overview of the fingerprint authentication device, a configuration of the fingerprint authentication device, and a flow in the processes performed by the fingerprint authentication device will be explained, followed by a description of an advantageous effect of the second embodiment.

First, an overview of the fingerprint authentication device according to the second embodiment will be explained. The overview of the fingerprint authentication device according to the second embodiment can be summarized as follows: In the case where an authentication result indicating that an authentication process has failed has been obtained by using the minutia method, the fingerprint authentication device requests the user to re-input a fingerprint image. In particular, the fingerprint authentication device is able to reduce the time and effort required from the user during the fingerprint authentication process by preventing the situation where the user is requested to re-input a fingerprint image in vain.

More specifically, the fingerprint authentication device according to the second embodiment counts the number of minutiae in the fingerprints that are contained in both the input fingerprint information and the registered fingerprint information in an overlapping manner. After that, the fingerprint authentication device judges that the fingerprint authentication process has failed on the condition that the number of minutiae that have been counted does not satisfy a predetermined threshold value.

In the case where a judgment result indicating that the fingerprint authentication process has failed has been obtained, the fingerprint authentication device calculates, as an overlapping area size, the size of such an area in which the input fingerprint information and the registered fingerprint information overlap each other that corresponds to the time when the input fingerprint information and the registered fingerprint information are caused to overlap each other in such a manner that the positions of the corresponding minutiae that are contained in both the input fingerprint information and the registered fingerprint information in an overlapping manner match each other.

Subsequently, the fingerprint authentication device converts the similarity level to the number of minutiae that corresponds to the time when the input fingerprint information and the registered fingerprint information completely overlap each other, by using the ratio of the overlapping area size to the area size of the registered fingerprint information. After that, the fingerprint authentication device judges that the fingerprint authentication device should request the user to re-input an input fingerprint image on the condition that the number of minutiae obtained as a result of the converting process satisfies a predetermined threshold value and requests the user to re-input an input fingerprint image.

Next, a configuration of the fingerprint authentication device 10 according to the second embodiment will be explained. In the following sections, differences between the configuration of the fingerprint authentication device 10 according to the second embodiment and the configuration of the fingerprint authentication device 10 according to the first embodiment will be explained in detail.

The registered fingerprint information storage unit 21 stores therein registered fingerprint information that indicates the minutiae (for example, the positions and the directions of branching points of ridges and the positions and the directions of ends points of ridges) that are contained in the registered fingerprint information.

When having received an input fingerprint image from the fingerprint image input unit 1, the fingerprint information generating unit 31 generates input fingerprint information that indicates the minutiae that are contained in the input fingerprint image and inputs the generated input fingerprint information to the fingerprint comparing unit 32.

The fingerprint comparing unit 32 counts, as a similarity level, the number of minutiae in the fingerprints that are contained in both the input fingerprint information and the registered fingerprint information in an overlapping manner. The fingerprint comparing unit 32 judges that the fingerprint authentication process has successfully been performed on the condition that the similarity level satisfies the predetermined threshold value. More specifically, when having received the input fingerprint information from the fingerprint information generating unit 31, the fingerprint comparing unit 32 counts, as the similarity level, the number of minutiae in the fingerprints that are contained in both the input fingerprint information and the registered fingerprint information in an overlapping manner, by comparing the input fingerprint information with the registered fingerprint information. Subsequently, the fingerprint comparing unit 32 judges whether the fingerprint authentication process has successfully been performed by comparing the similarity level with a specified threshold value "α2" used for judging whether the fingerprint authentication process has successfully been performed.

In this situation, in the case where the similarity level satisfies the specified threshold value "α2", the fingerprint comparing unit 32 judges that the fingerprint authentication process has successfully been performed and outputs a result indicating that the fingerprint authentication process has successfully been performed to the user, via the output unit 3. On the contrary, in the case where the similarity level does not satisfy the specified threshold value "α2", the fingerprint comparing unit 32 judges that the fingerprint authentication process has failed.

The output judging unit 33 obtains, as an overlapping area size, the size of such an area in which the input fingerprint information and the registered fingerprint information overlap each other that corresponds to the time when the input fingerprint information and the registered fingerprint information are caused to overlap each other in such a manner that the positions of the corresponding minutiae that are contained in both the input fingerprint information and the registered fingerprint information in an overlapping manner match each other. Subsequently, the output judging unit 33 converts the similarity level that has been calculated by the fingerprint comparing unit 32 into a similarity level corresponding to the time when the input fingerprint information and the registered fingerprint information completely overlap each other, by using the ratio of the overlapping area size to the area size of the registered fingerprint information. After that, the output judging unit 33 judges that the fingerprint authentication device should request the user to re-input an input fingerprint image on the condition that the similarity level obtained as a result of the converting process satisfies the specified threshold value.

More specifically, in the case where the fingerprint comparing unit 32 has obtained an authentication result indicating that the authentication process has failed, the output judging unit 33 obtains the overlapping area size corresponding to the time when the input fingerprint information and the registered fingerprint information are caused to overlap each other in such a manner that the positions of the corresponding minutiae match each other, based on the positional relationships of the minutiae that are contained in both the input fingerprint information and the registered fingerprint information in an overlapping manner. Subsequently, the output judging unit 33 compares the overlapping area size with a specified area size "β3" that is specified in advance as a condition for requesting the user to re-input an input fingerprint image.

In this situation, in the case where the overlapping area size is equal to or larger than the specified area size "β3", the output judging unit 33 judges that the fingerprint authentication device should not request the user to re-input an input fingerprint image and outputs a result indicating that the fingerprint authentication process has failed to the user, via the output unit 3.

On the contrary, in the case where the overlapping area size is smaller than the specified area size "β3", the output judging unit 33 calculates the ratio of the overlapping area size to the area size of the registered fingerprint information.

Subsequently, the output judging unit 33 converts the similarity level that has been calculated by the fingerprint comparing unit 32 into the similarity level corresponding to the time when the input fingerprint information and the registered fingerprint information completely overlap each other, by multiplying the former similarity level by the inverse of the ratio of the overlapping area size to the area size of the registered fingerprint information. The output judging unit 33 then compares the latter similarity level obtained as a result of the converting process with the specified threshold value "α2".

In this situation, in the case where a judgment result indicating that the similarity level obtained as a result of the converting process satisfies the threshold value "α2" has been obtained, the output judging unit 33 judges that the fingerprint authentication device should request the user to re-input an input fingerprint image and requests the user to re-input an input fingerprint image, via the output unit 3.

On the contrary, in the case where a judgment result indicating that the similarity level obtained as a result of the converting process does not satisfy the specified threshold value "α2" has been obtained, the output judging unit 33 judges that the fingerprint authentication device should not request the user to re-input an input fingerprint image and outputs a result indicating that the fingerprint authentication process has failed to the user, via the output unit 3.

Figure 5:
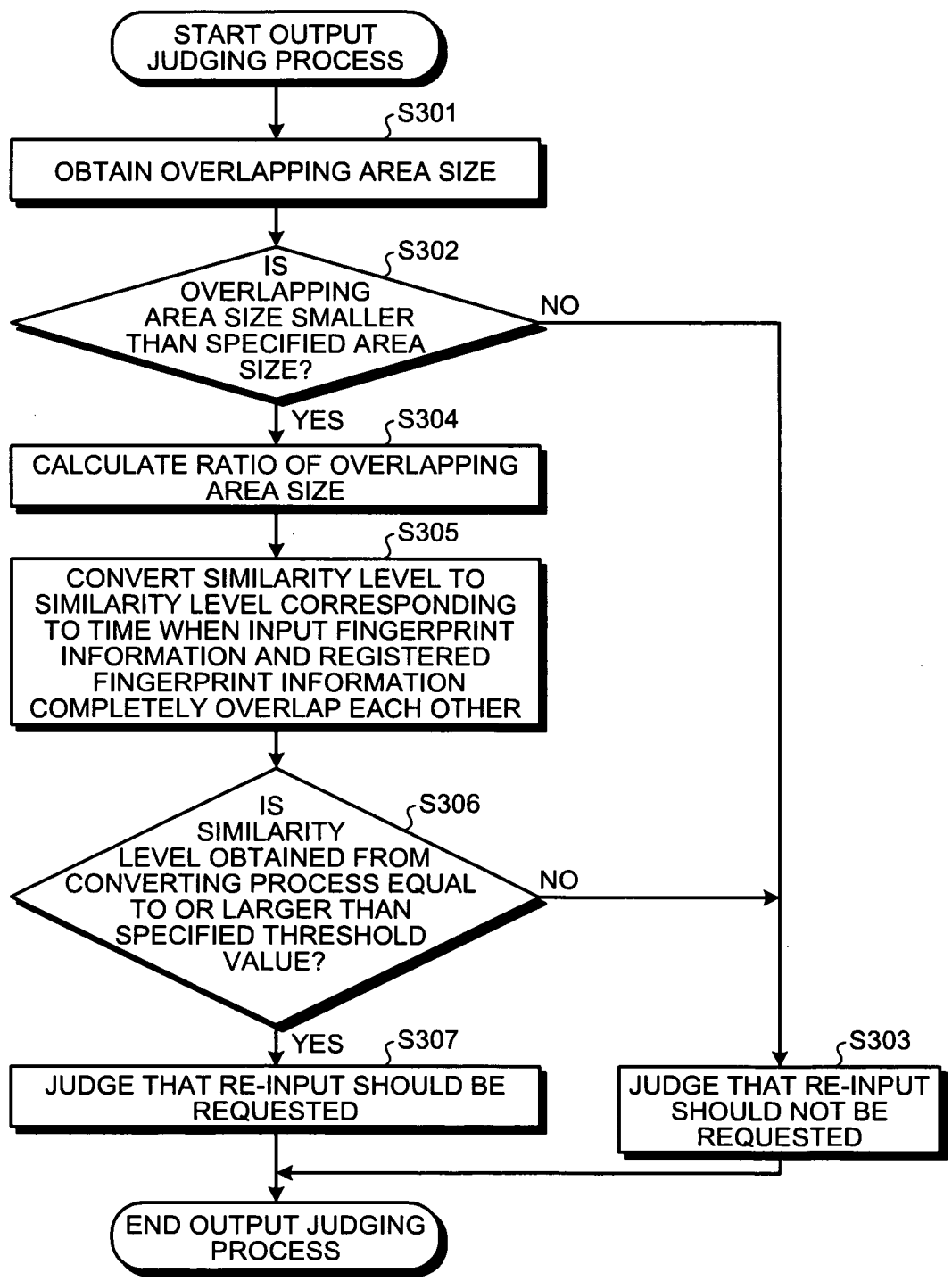
FIG. 5 is a flowchart for explaining a flow in an output judging process performed by a fingerprint authentication device according to a second embodiment.

Next, processes performed by the fingerprint authentication device 10 according to the second embodiment will be explained, with reference to FIG. 5. FIG. 5 is a flowchart for explaining a flow in an output judging process performed by the fingerprint authentication device according to the second embodiment.

As depicted in FIG. 5, when the output judging unit 33 has started the output judging process, the output judging unit 33 obtains an overlapping area size corresponding to the time when the input fingerprint information and the registered fingerprint information are caused to overlap each other in such a manner that the positions of the corresponding minutiae in the fingerprints that are contained in both of the images in an overlapping manner match each other (Step S301) and compares the obtained overlapping area size with the specified area size (Step S302).

In this situation, in the case where the overlapping area size is equal to or larger than the specified area size (No at Step S302), the output judging unit 33 judges that the fingerprint authentication device should not request the user to re-input an input fingerprint image (Step S303).

On the contrary, in the case where the overlapping area size is smaller than the specified area size (Yes at Step S302), the output judging unit 33 calculates the ratio of the overlapping area size to the area size of the registered fingerprint information (Step S304).

Subsequently, the output judging unit 33 converts the calculated similarity level into a similarity level corresponding to the time when the input fingerprint information and the registered fingerprint information completely overlap each other (Step S305) and compares the similarity level obtained as result of the converting process with the specified threshold value (Step S306).

In this situation, in the case where a judgment result indicating that the similarity level obtained as a result of the converting process satisfies the specified threshold value has been obtained (Yes at Step S306), the output judging unit 33 judges that the fingerprint authentication device should request the user to re-input an input fingerprint image (Step S307).

On the contrary, in the case where a judgment result indicating that the similarity level obtained as a result of the converting process does not satisfy the specified threshold value has been obtained (No at Step S306), the output judging unit 33 judges that the fingerprint authentication device should not request the user to re-input an input fingerprint image (Step S303).

As explained above, according to the second embodiment, even in the case where it is judged whether the fingerprint authentication process has successfully been performed by using the minutia method, it is possible to reduce the time and effort required from the user during the fingerprint authentication process by preventing the situation where the user is requested to re-input a fingerprint image in vain.

It is acceptable to configure the fingerprint authentication device according to the first embodiment or the second embodiment described above so as to provide guidance regarding a method for inputting a fingerprint image, when the fingerprint authentication device requests the user to re-input an input fingerprint image. Accordingly, as a third embodiment, an example will be explained in which the fingerprint authentication device outputs a method for inputting a fingerprint image when requesting the user to re-input an input fingerprint image. In the description of the third embodiment below, a configuration of the fingerprint authentication device, and a flow in the processes performed by the fingerprint authentication device will be explained, followed by a description of an advantageous effect of the third embodiment.

Figure 6:
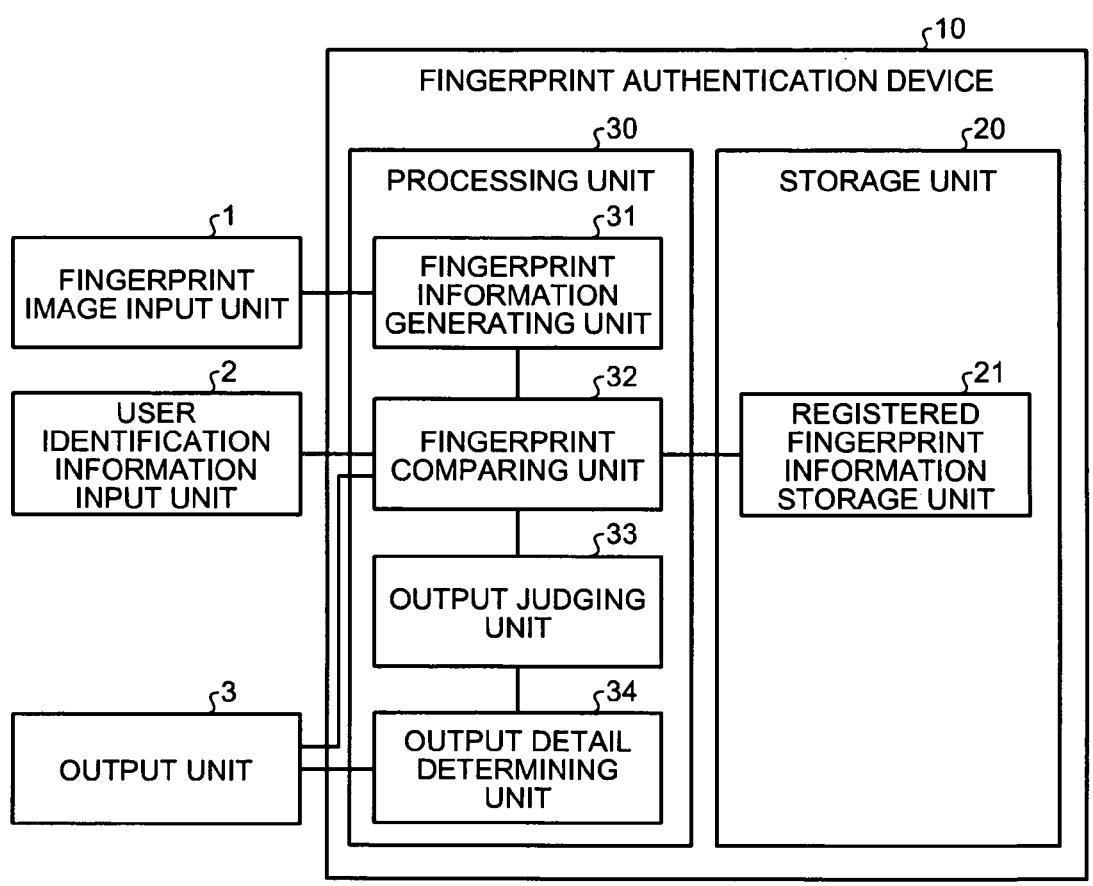
FIG. 6 is a block diagram of a fingerprint authentication device according to a third embodiment.

First, a configuration of the fingerprint authentication device 10 according to the third embodiment will be explained, with reference to FIG. 6. FIG. 6 is a block diagram of the fingerprint authentication device according to the third embodiment. As depicted in FIG. 6, in addition to the feature where an output detail determining unit 34 is further included, the differences between the configuration of the fingerprint authentication device 10 according to the third embodiment and the configuration of the fingerprint authentication device 10 according to the first embodiment can be explained as below.

The output detail determining unit 34 determines that a method for inputting such a fingerprint image that makes the overlapping area size larger is the details of the inputting method to be output to the user. More specifically, in the case where the output judging unit 33 has obtained a judgment result indicating that the fingerprint authentication device should request the user to re-input a fingerprint image, the output detail determining unit 34 obtains one of the displacement amounts having the highest evaluation value from the output judging unit 33.

Subsequently, the output detail determining unit 34 specifies the method for inputting such a fingerprint image that makes the overlapping area size larger, by using the obtained displacement amount and determines that the specified inputting method is the details of the fingerprint image inputting method that is to be output to the user. For example, the output detail determining unit 34 generates positional relationship information indicating a relative positional relationship (e.g., the parallel displacement amount and the rotation angle) within the overlapping area between the registered fingerprint information and the input fingerprint information and determines that the generated positional relationship information is the details of the inputting method.

After that, the output detail determining unit 34 requests the user to re-input an input fingerprint image while outputting the fingerprint image inputting method via the output unit 3. For example, the output detail determining unit 34 requests the user to re-input an input fingerprint image while outputting a message indicating positional relationship information such as "the fingerprint image is displaced from the registered fingerprint by 3 millimeters to the left and 5 millimeters upward".

Next, processes performed by the fingerprint authentication device 10 according to the third embodiment will be explained, with reference to FIG. 7. FIG. 7 is a flowchart for explaining a flow in the processes performed by the fingerprint authentication device according to the third embodiment. In the following sections, the differences between the processes performed by the fingerprint authentication device 10 according to the third embodiment and the processes performed by the fingerprint authentication device 10 according to the first embodiment will be explained in detail.

As depicted in FIG. 7, in the case where a judgment result indicating that the fingerprint authentication device should request the user to re-input an input fingerprint image has been obtained (Yes at Step S407), the output detail determining unit 34 specifies a method for inputting such a fingerprint image that makes the overlapping area size larger and determines that the specified inputting method is the details of the inputting method to be output to the user (Step S409).

After that, the output detail determining unit 34 requests the user to re-input an input fingerprint image while outputting the fingerprint image inputting method that has been determined as the details (Step S410). The fingerprint comparing unit 32 compares input fingerprint information generated from the input fingerprint image that has been re-input with the registered fingerprint information again (Step S404).

As explained above, according to the third embodiment, by providing the guidance regarding the method for inputting a fingerprint image, the fingerprint authentication device is able to reduce the time and effort required from the user during the fingerprint authentication process, by reducing the number of times the user is requested to re-input a fingerprint image.

Figure 8A:
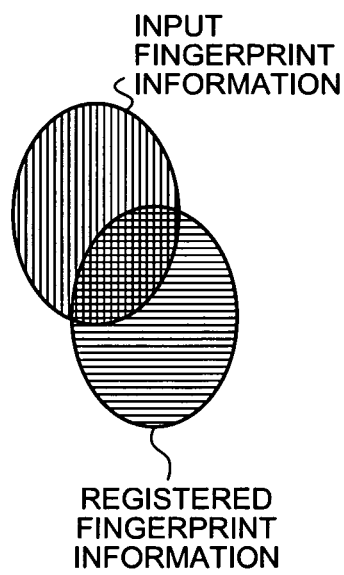
FIGS. 8A to 8C are drawings of examples of information that is output by the fingerprint authentication device according to the third embodiment.

Another arrangement is acceptable in which, as depicted in FIG. 8A, the output detail determining unit 34 requests the user to re-input an input fingerprint image while outputting a conceptual drawing indicating a relative positional relationship between the input fingerprint information and the registered fingerprint information. With this arrangement, the fingerprint authentication device is able to help the user to intuitively understand an optimal fingerprint image inputting method.

Figure 8B:
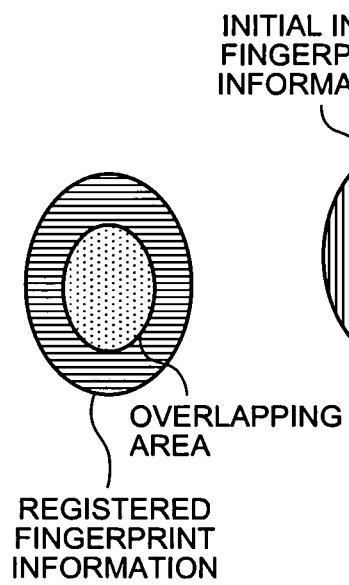

Yet another arrangement is acceptable in which, as depicted in FIG. 8B, the output detail determining unit 34 requests the user to re-input an input fingerprint image while outputting a conceptual drawing indicating a relative positional relationship between the registered fingerprint information and the overlapping area. With this arrangement, the fingerprint authentication device is able to help the user understand that the user will be able to input an optimal fingerprint image by making the region in which a fingerprint image is captured larger (in other words, by pressing the finger hard against the fingerprint image input unit 1).

Figure 8C:
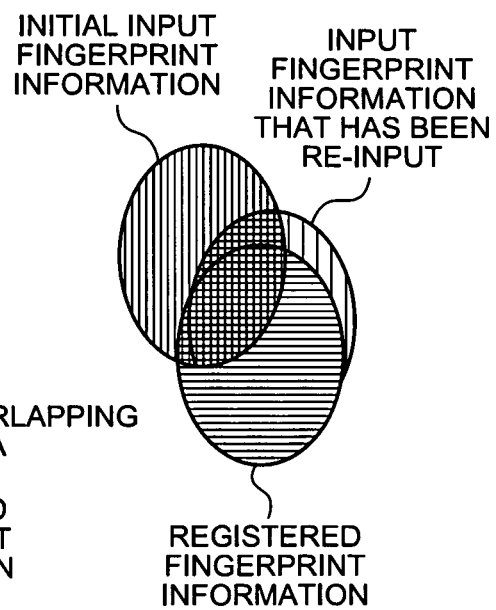

Further, yet another arrangement is acceptable in which, as depicted in FIG. 8C, the output detail determining unit 34 adds a positional relationship of input fingerprint information that has been re-input to the conceptual drawing indicating the relative positional relationship between the input fingerprint information and the registered fingerprint information. With this arrangement, the fingerprint authentication device is able to let the user feel that, every time a fingerprint image is re-input, the captured fingerprint image is getting closer to an optimal fingerprint image for the fingerprint authentication process.

Figure 9:
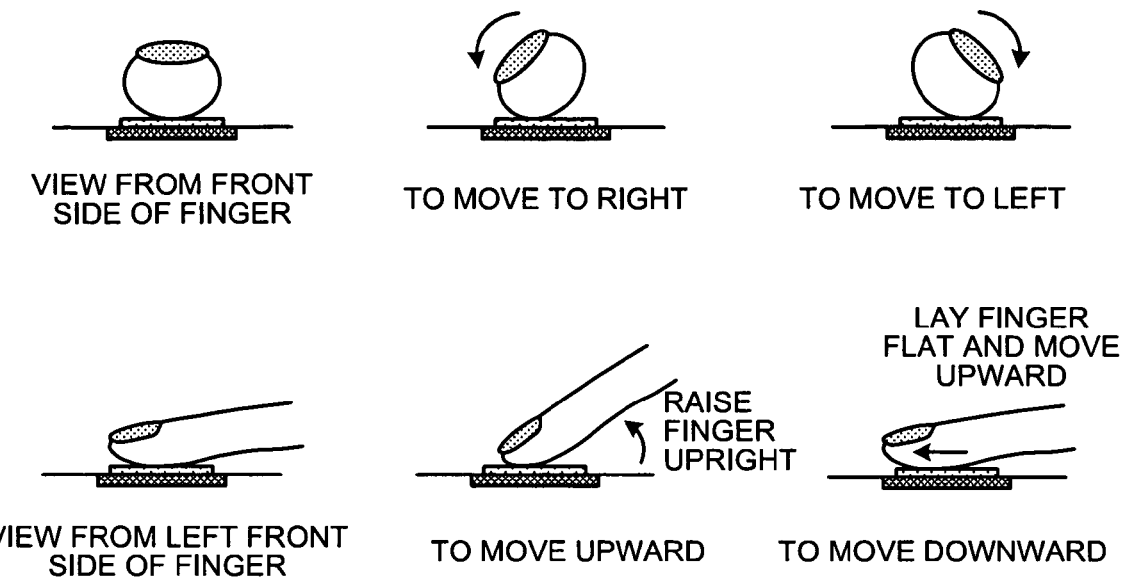
FIG. 9 is another drawing of examples of information that is output by the fingerprint authentication device according to the third embodiment.

Furthermore, yet another arrangement is acceptable in which, as depicted in FIG. 9, the fingerprint authentication device 10 outputs information regarding how the finger should be brought into contact with the fingerprint image input unit 1, as the fingerprint image inputting method.

Figure 10A:
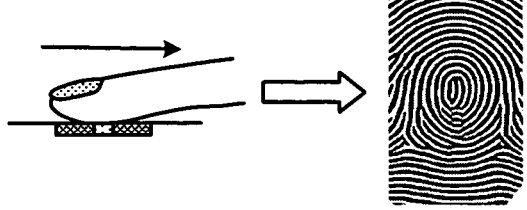
FIGS. 10A to 10E are yet another set of drawings of examples of information that is output by the fingerprint authentication device according to the third embodiment.
Figure 10B:
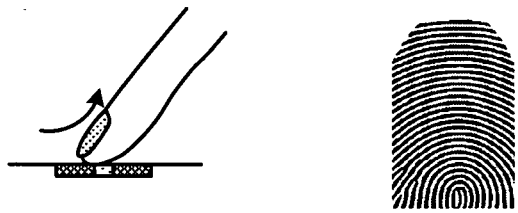
Figure 10C:
Figure 10D:
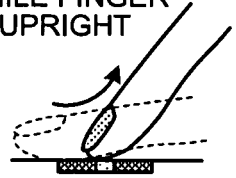
Figure 10E:
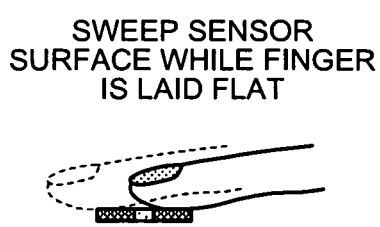

As yet another example, in the case where the fingerprint image input unit 1 is a fingerprint sensor that requires the user to move the finger when capturing the fingerprint (i.e., the fingerprint image input unit 1 is a so-called sweep-type fingerprint sensor), the captured fingerprint image will vary depending on how the user moves the finger, as depicted in FIGS. 10A and 10B. Thus, yet another arrangement is acceptable in which, as depicted in FIGS. 10C to 10E, the fingerprint authentication device 10 outputs information regarding how the finger should be moved as the fingerprint image inputting method.

In addition, the fingerprint authentication device 10 may output each fingerprint image inputting method individually or may output a plurality of fingerprint image inputting methods in combination. Also, by configuring the fingerprint authentication device so as to generate positional relationship information, based on positional relationships of predetermined minutiae that are contained in both the input fingerprint information and the registered fingerprint information in an overlapping manner, it is possible to apply the third embodiment to the example in which it is judged whether the fingerprint authentication process has successfully been performed by using the minutia method. FIGS. 8A to 10E are drawings of examples of information that is output by the fingerprint authentication device according to the third embodiment.

In the description of the first through the third embodiments above, the example is explained in which a so-called one-to-one authentication process is performed, i.e., the registered fingerprint information identified by a user ID is compared with the input fingerprint information. However, the present invention is not limited to this example. It is possible to apply the present invention to the fingerprint authentication device 10 that performs a so-called one-to-N authentication process, i.e., the fingerprint authentication device 10 judges whether the fingerprint authentication process has successfully been performed, based on a comparison result obtained by comparing all the pieces of registered fingerprint information with the input fingerprint information. Accordingly, as a fourth embodiment, an example will be explained in which the present invention is applied to the fingerprint authentication device 10 that performs the one-to-N authentication process. In the description of the fourth embodiment below, a configuration of the fingerprint authentication device and a flow in the processes performed by the fingerprint authentication device will be explained, followed by a description of an advantageous effect of the fourth embodiment.

Figure 11:
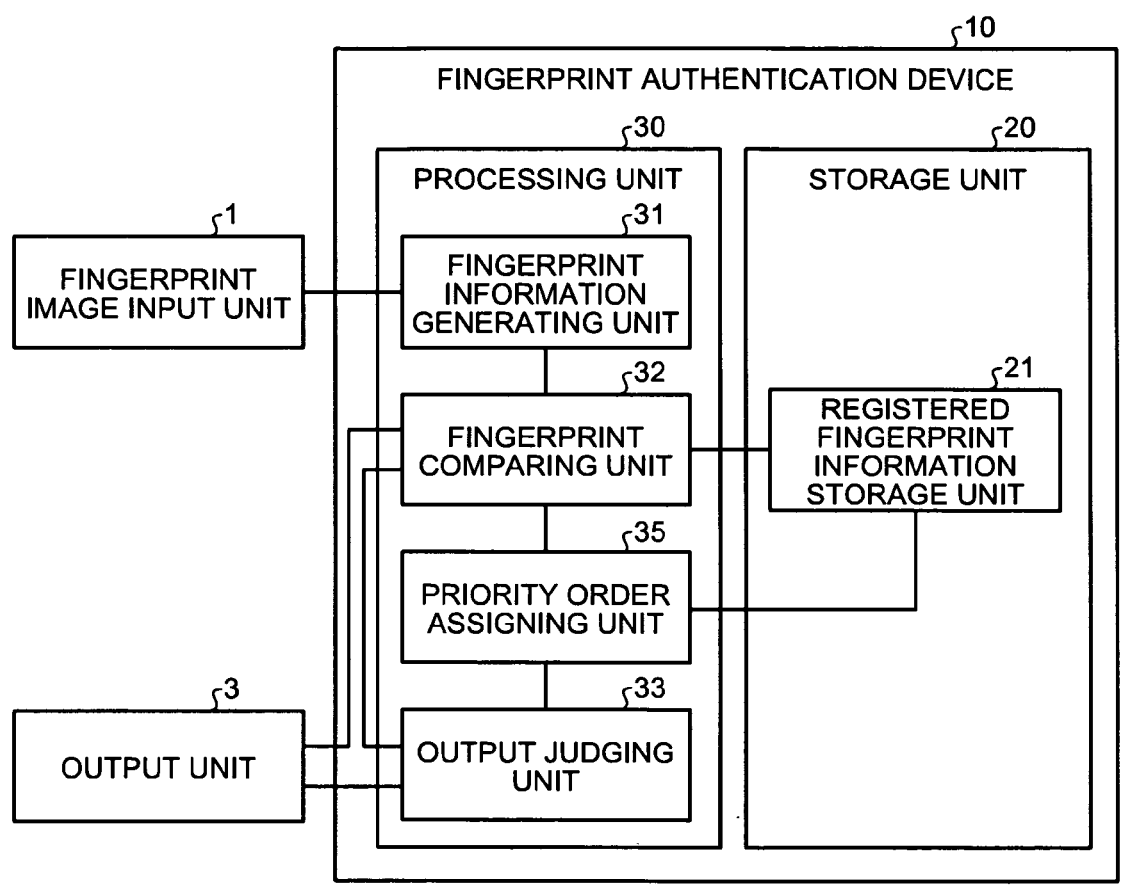
FIG. 11 is a block diagram of a fingerprint authentication device according to a fourth embodiment.

First, a configuration of the fingerprint authentication device 10 according to the fourth embodiment will be explained, with reference to FIG. 11. FIG. 11 is a block diagram of the fingerprint authentication device according to the fourth embodiment. As depicted in FIG. 11, in addition to the feature where a priority order assigning unit 35 is included instead of the user identification information input unit 2, the differences between the configuration of the fingerprint authentication device 10 according to the fourth embodiment and the configuration of the fingerprint authentication device 10 according to the first embodiment can be explained as below.

The fingerprint comparing unit 32 calculates a similarity level in correspondence with each of all the user IDs and judges whether a fingerprint authentication process has successfully been performed for each of the user IDs. More specifically, when having received the input fingerprint information from the fingerprint information generating unit 31, the fingerprint comparing unit 32 reads the pieces of registered fingerprint information that are stored in the registered fingerprint information storage unit 21 and respectively correspond to all the user IDs. For each of the user IDs, the fingerprint comparing unit 32 calculates a similarity level and judges whether a fingerprint authentication process has successfully been performed. In this situation, in the case where there is a user ID that corresponds to a similarity level satisfying the specified threshold value "α1", the fingerprint comparing unit 32 judges that the fingerprint authentication process has successfully been performed. On the contrary, in the case where none of the similarities respectively corresponding to all the user IDs satisfies the specified threshold value "α1", the fingerprint comparing unit 32 judges that the fingerprint authentication process has failed.

Also, when the fingerprint comparing unit 32 has received, from the fingerprint information generating unit 31, input fingerprint information generated from an input fingerprint image that has been re-input, the fingerprint comparing unit 32 compares the registered fingerprint information corresponding to the user ID selected by the output judging unit 33 with the input fingerprint information.

In the case where an authentication result indicating that the authentication process has failed has been obtained for each of all the user IDs, the priority order assigning unit 35 assigns a priority order number to each of the user IDs so as to specify the order in which the fingerprint authentication device should request the users to re-input an input fingerprint image. More specifically, in the case where the fingerprint comparing unit 32 has obtained an authentication result indicating that the authentication process has failed, the priority order assigning unit 35 obtains the similarity levels respectively corresponding to all the user IDs from the fingerprint comparing unit 32. After that, the priority order assigning unit 35 assigns a priority order number corresponding to how high the similarity level is, to each of two or more of the user IDs that are selected out of all the user IDs stored in the registered fingerprint information storage unit 21 in descending order of the similarity levels thereof.

The output judging unit 33 calculates an overlapping area size in correspondence with each of the user IDs. Every time a judgment result indicating that the fingerprint authentication device should not request the user to re-input an input fingerprint image has been obtained, the output judging unit 33 judges whether the fingerprint authentication device should request the user to re-input an input fingerprint image by using an overlapping area size and a similarity level corresponding to the user ID having the next highest priority order after the user ID that was selected in the immediately-preceding judging process.

More specifically, in the case where the fingerprint comparing unit 32 has obtained an authentication result indicating that the authentication process has failed, the output judging unit 33 selects one of the user IDs having the highest priority order, by referring to the registered fingerprint information storage unit 21. Subsequently, the output judging unit 33 obtains the displacement amount, the evaluation value, and the overlapping area size corresponding to the selected user ID and judges whether the fingerprint authentication device should request the user to re-input an input fingerprint image.

In this situation, in the case where a judgment result indicating that the fingerprint authentication device should request the user to re-input an input fingerprint image has been obtained, the output judging unit 33 requests the user to re-input an input fingerprint image, via the output unit 3. After that, in the case where an authentication result indicating that the authentication process has failed has been obtained as a result of comparing input fingerprint information generated from the input fingerprint image that has been re-input with the registered fingerprint information, the output judging unit 33 obtains an overlapping area size again to judge one more time whether the fingerprint authentication device should request the user to re-input an input fingerprint image.

On the contrary, in the case where a judgment result indicating that the fingerprint authentication device should not request the user to re-input an input fingerprint image has been obtained, the output judging unit 33 judges whether there is a user ID to be selected having the next highest priority order after the user ID that was selected in the immediately-preceding judging process, by referring to the registered fingerprint information storage unit 21.

In this situation, in the case where there is no user ID to be selected, the output judging unit 33 outputs a result indicating that the fingerprint authentication process has failed to the user, via the output unit 3.

On the contrary, in the case where there is a user ID to be selected, the output judging unit 33 selects the user ID having the next highest priority order after the user ID that was selected in the immediately-preceding judging process. Subsequently, the output judging unit 33 obtains the displacement amount, the evaluation value, and the overlapping area size that correspond to the selected user ID and judges whether the fingerprint authentication device should request the user to re-input an input fingerprint image.

Figure 12:
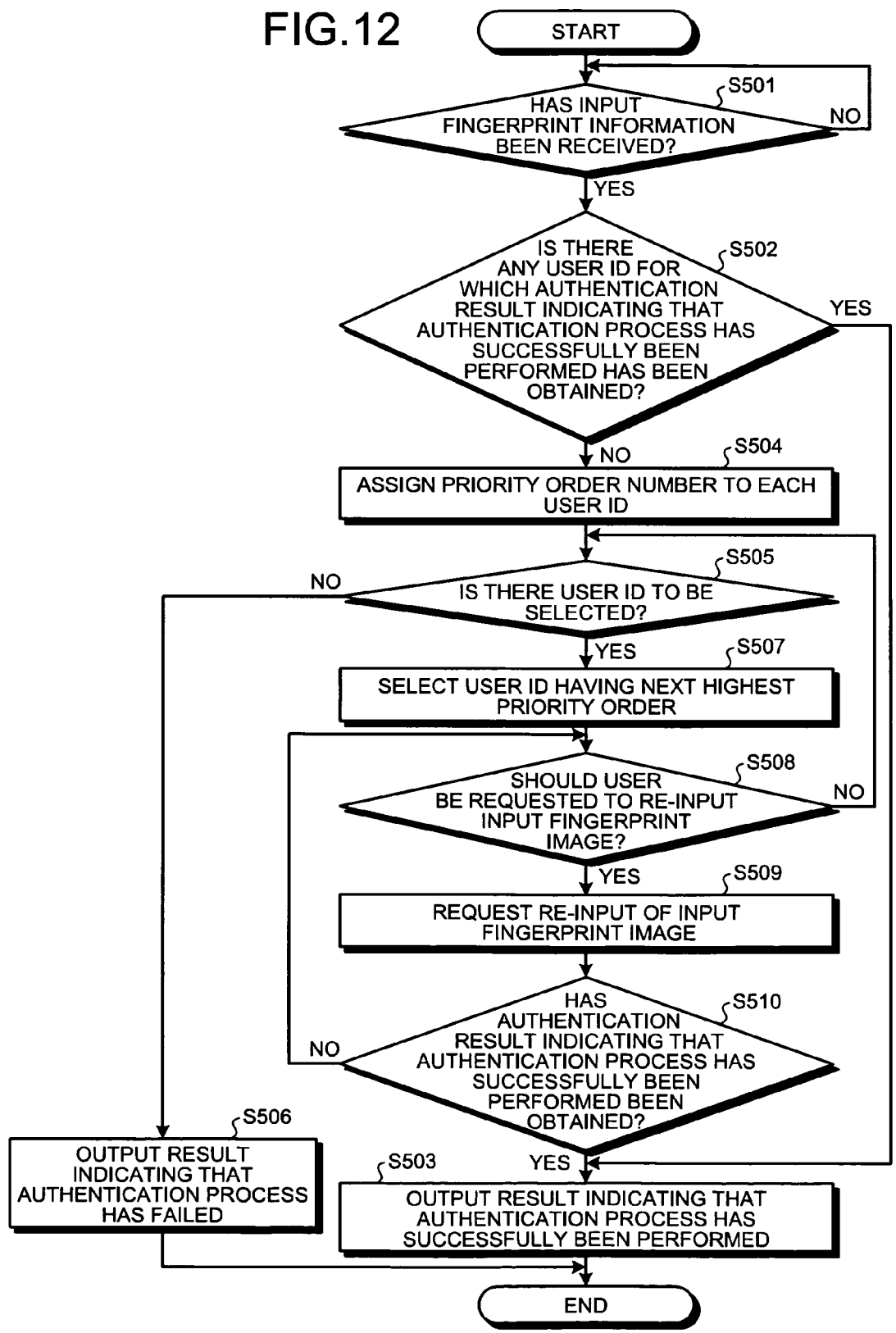
FIG. 12 is a flowchart for explaining a flow in processes performed by the fingerprint authentication device according to the fourth embodiment.

Next, processes performed by the fingerprint authentication device 10 according to the fourth embodiment will be explained, with reference to FIG. 12. FIG. 12 is a flowchart for explaining a flow in the processes performed by the fingerprint authentication device according to the fourth embodiment.

As depicted in FIG. 12, when the fingerprint comparing unit 32 has received input fingerprint information generated from an input fingerprint image (Yes at Step S501), the fingerprint comparing unit 32 calculates a similarity level in correspondence with each of all the user IDs and judges, for each of the user IDs, whether a fingerprint authentication process has successfully been performed (Step S502).

In this situation, in the case where there is a user ID for which an authentication result indicating that the authentication process has successfully been performed has been obtained (Yes at Step S502), the fingerprint comparing unit 32 outputs a result indicating that the fingerprint authentication process has successfully been performed (Step S503) and ends the process.

On the contrary, in the case where an authentication result indicating that the authentication process has failed has been obtained for each of all the user IDs (No at Step S502), the priority order assigning unit 35 assigns a priority order number corresponding to how high the similarity level is, to each of the user IDs (Step S504).

Subsequently, the output judging unit 33 judges whether there is a user ID to be selected having the next highest priority order after the user ID that was selected in the immediately-preceding judging process (Step S505).

In this situation, in the case where there is no user ID to be selected (No at Step S505), the output judging unit 33 outputs a result indicating that the fingerprint authentication process has failed (Step S506) and ends the process.

On the contrary, in the case where there is a user ID to be selected (Yes at Step S505), the output judging unit 33 selects the user ID having the next highest priority order after the user ID that was selected in the immediately-preceding judging process (Step S507) and judges whether the fingerprint authentication device should request the user to re-input an input fingerprint image (Step S508).

In this situation in the case where a judgment result indicating that the fingerprint authentication device should not request the user to re-input an input fingerprint image has been obtained (No at Step S508), the output judging unit 33 judges again whether there is a user ID to be selected (Step S505).

On the contrary, in the case where a judgment result indicating that the fingerprint authentication device should request the user to re-input an input fingerprint image has been obtained, (Yes at Step S508), the output judging unit 33 requests the user to re-input an input fingerprint image (Step S509).

After that, the fingerprint comparing unit 32 judges again whether the fingerprint authentication process has successfully been performed by comparing the input fingerprint information that has been re-input with the registered fingerprint information corresponding to the selected user ID (Step S510).

In this situation, in the case where an authentication result indicating that the authentication process has successfully been performed has been obtained (Yes at Step S510), the fingerprint comparing unit 32 outputs a result indicating that the fingerprint authentication process has successfully been performed (Step S503) and ends the process.

On the contrary, in the case where an authentication result indicating that the authentication process has failed has been obtained (No at Step S510), the output judging unit 33 judges again whether the fingerprint authentication device should request the user to re-input an input fingerprint image with respect to the selected user ID (Step S508).

As explained above, according to the fourth embodiment, even in the case where the fingerprint authentication device performs the one-to-N authentication process, it is possible to reduce the time and effort required from the user during the fingerprint authentication process by preventing the situation where the user is requested to re-input a fingerprint image in vain.

Another arrangement is acceptable in which the priority order assigning unit 35 assigns a priority order number to each of the user IDs in descending order of the overlapping area sizes thereof.

There may be situations in which the registered fingerprint information itself that has been registered in advance is not appropriate for the fingerprint authentication process, and thus the time and effort required from the user during the fingerprint authentication process are increased. Accordingly, as a fifth embodiment, an example will be explained in which the fingerprint authentication device requests the user to re-register registered fingerprint information. In the description of the fifth embodiment below, a configuration of the fingerprint authentication device, and a flow in the processes performed by the fingerprint authentication device will be explained, followed by a description of an advantageous effect of the fifth embodiment.

Figure 13:
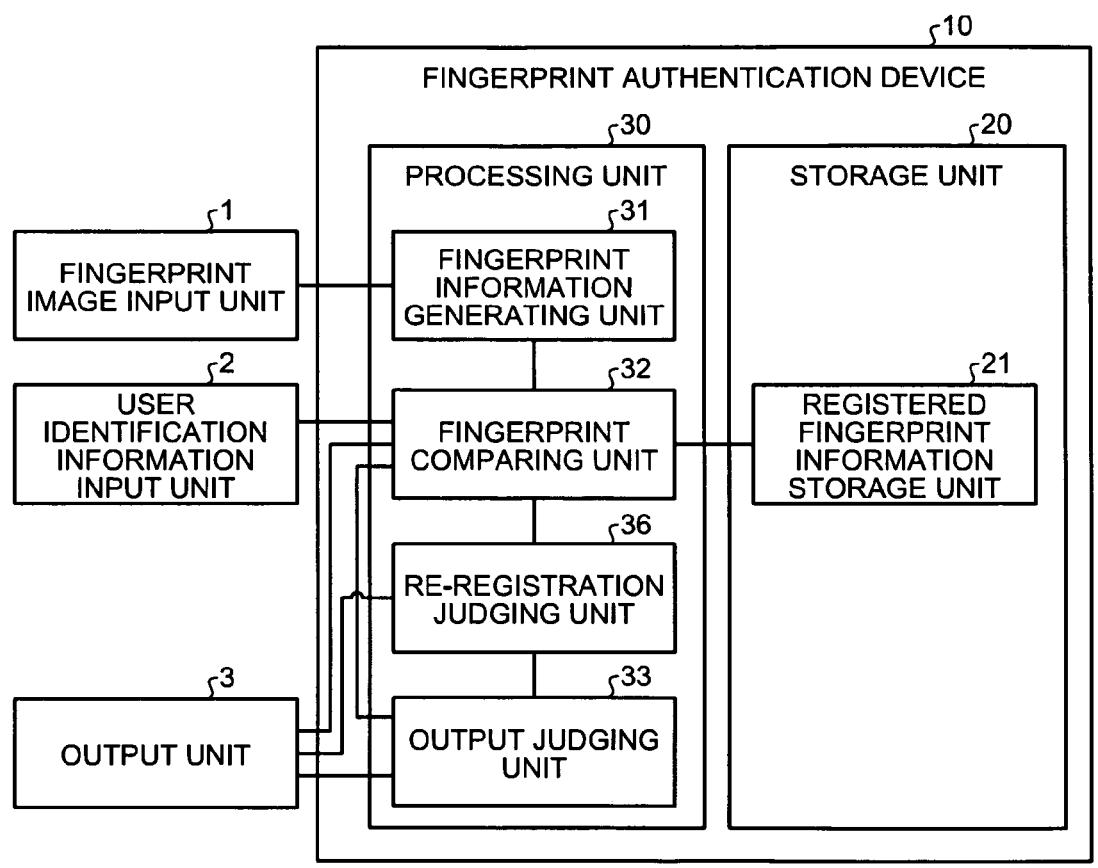
FIG. 13 is a block diagram of a fingerprint authentication device according to a fifth embodiment.

First, a configuration of the fingerprint authentication device 10 according to the fifth embodiment will be explained, with reference to FIG. 13. FIG. 13 is a block diagram of the fingerprint authentication device according to the fifth embodiment. As depicted in FIG. 13, in addition to the feature where a re-registration judging unit 36 is further included, the differences between the configuration of the fingerprint authentication device 10 according to the fifth embodiment and the configuration of the fingerprint authentication device 10 according to the first embodiment can be explained as below. The re-registration judging unit 36 may also be referred to as a re-registration requesting unit.

In the case where an authentication result indicating that the authentication process has successfully been performed has been obtained, based on a comparison result obtained by comparing input fingerprint information generated from the input fingerprint image that has been re-input with the registered fingerprint information, the re-registration judging unit 36 requests the user to re-register registered fingerprint information.

More specifically, in the case where the fingerprint comparing unit 32 has obtained an authentication result indicating that the authentication process has successfully been performed, the re-registration judging unit 36 judges whether the output judging unit 33 had earlier requested the user to re-input an input fingerprint image. In this situation, in the case where the output judging unit 33 had earlier requested the user to re-input an input fingerprint image, the re-registration judging unit 36 requests the user to re-register registered fingerprint information, via the output unit 3. In other words, in the case where an input fingerprint image had been input a plurality of number of times before the authentication result indicating that the authentication process has successfully been performed was obtained, the re-registration judging unit 36 requests the user to re-register registered fingerprint information.

On the contrary, in the case where the output judging unit 33 had not requested the user to re-input an input fingerprint image earlier, the re-registration judging unit 36 ends the process, without taking any further procedure. In other words, in the case where an authentication result indicating that the authentication process has successfully been performed was obtained based on the initial input of an input fingerprint image, the re-registration judging unit 36 ends the process without requesting the user to re-register registered fingerprint information.

Figure 14:
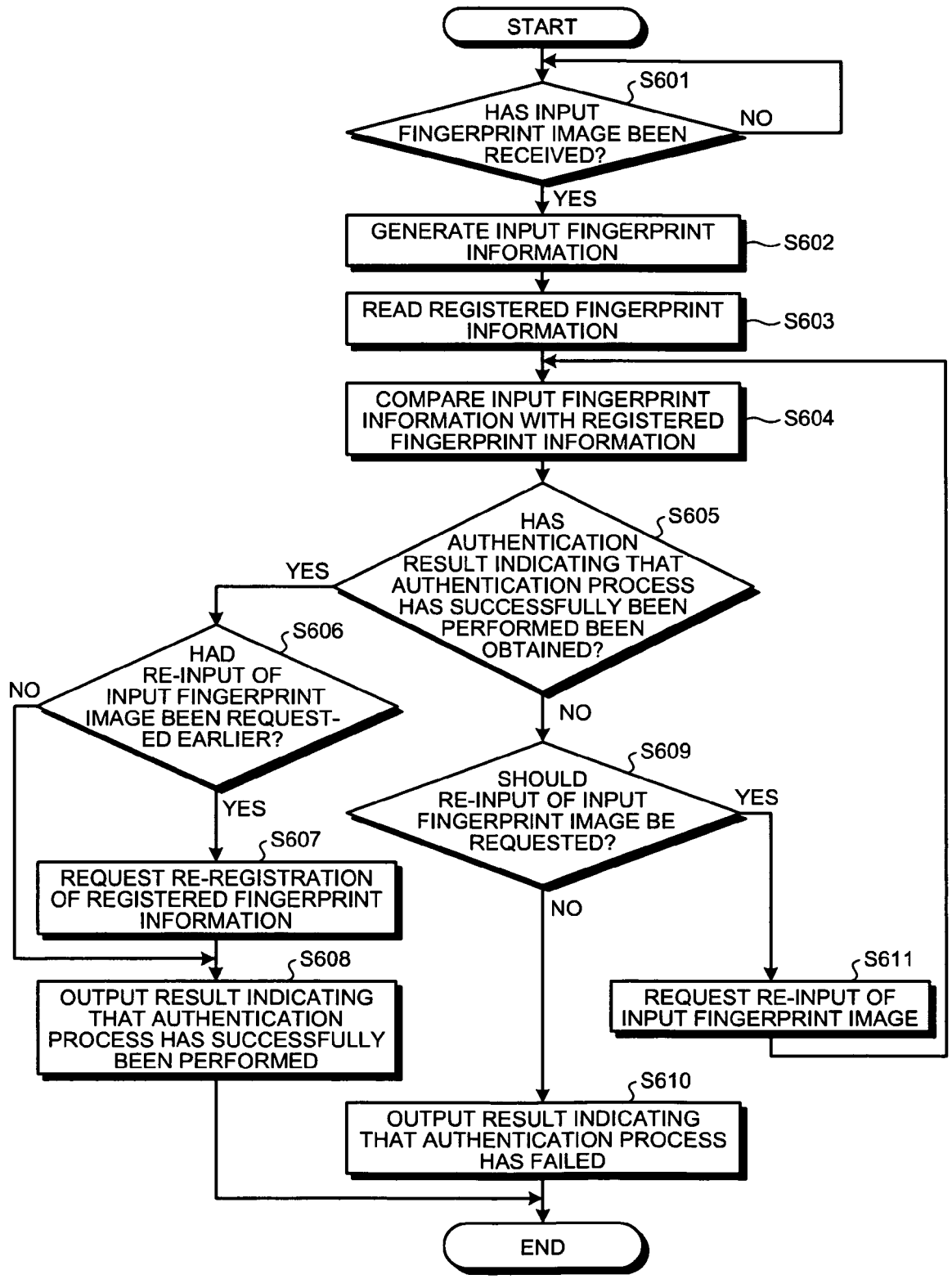
FIG. 14 is a flowchart for explaining a flow in processes performed by the fingerprint authentication device according to the fifth embodiment.

Next, processes performed by the fingerprint authentication device 10 will be explained, with reference to FIG. 14. FIG. 14 is a flowchart for explaining a flow in the processes performed by the fingerprint authentication device according to the fifth embodiment. In the following sections, the differences between the processes performed by the fingerprint authentication device 10 according to the fifth embodiment and the processes performed by the fingerprint authentication device 10 according to the first embodiment will be explained in detail.

As depicted in FIG. 14, in the case where an authentication result indicating that the authentication process has successfully been performed has been obtained (Yes at Step S605), the re-registration judging unit 36 judges whether the fingerprint authentication device had earlier requested the user to re-input one or more input fingerprint images or the fingerprint authentication device had not yet requested the user to re-input any input fingerprint image (Step S606).

In this situation, in the case where a judgment result indicating that the fingerprint authentication device had earlier requested the user to re-input one or more input fingerprint images has been obtained (Yes at Step S606), the re-registration judging unit 36 requests the user to re-register registered fingerprint information (Step S607), and the fingerprint comparing unit 32 outputs a result indicating that the fingerprint authentication process has successfully been performed (Step S608) and ends the process.

On the contrary, in the case where a judgment result indicating that the fingerprint authentication device had not yet requested the user to re-input any input fingerprint image has been obtained (No at Step S606), the fingerprint comparing unit 32 outputs a result indicating that the fingerprint authentication process has successfully been performed (Step S608) and ends the process.

As explained above, according to the fifth embodiment, the fingerprint authentication device is able to make it possible to obtain, during the fingerprint authentication process, an authentication result indicating that the authentication process has successfully been performed, based on the initial input of an input fingerprint image. Thus, it is possible to reduce the time and effort required from the user during the fingerprint authentication process.

Another arrangement is acceptable in which the fingerprint authentication device 10 stores therein, for each of the user IDs, an overlapping area size, an authentication process result, and the like, as a history record (see FIG. 15), so that it is judged whether the fingerprint authentication device 10 should request the user to re-register registered fingerprint information by referring to the history records. FIG. 15 is a drawing for explaining examples of the history records stored in the fingerprint authentication device. In the drawing, the "number of times an input was required in each authentication process" is information used for identifying the number of times the user has been requested to input an input fingerprint image. For example, when the "number of times an input was required in each authentication process" is "1", it means that the fingerprint image obtained from the initial input of a fingerprint image was used in the authentication process. In contrast, when the "number of times an input was required in each authentication process" is "2", it means that the user was requested to re-input a fingerprint image "one" time, and the fingerprint image obtained from the "second" input of an input fingerprint image was used in the authentication process.

For example, another arrangement is acceptable in which it is judged whether the fingerprint authentication device 10 should request the user to re-register registered fingerprint information in the case where one or more of the history records having the value "1" in the "number of times an input was required in each authentication process" column indicate "failed" as the authentication result.

Further, yet another arrangement is acceptable in which the fingerprint authentication device 10 requests the user to re-register registered fingerprint information in the case where the "number of times an input was required in each authentication process" indicating how many times the user has been requested to re-input an input fingerprint image has reached a specified request number-of-times value that is specified as a condition for requesting the user to re-register registered fingerprint information.

In addition, yet another arrangement is acceptable in which, by referring to history records that have been stored during a predetermined period of time, the fingerprint authentication device 10 counts the number of times an authentication result indicating that the authentication process has failed has been obtained based on the initial input of an input fingerprint image and, in the case where the value indicating the number of times is equal to or larger than a predetermined value, the fingerprint authentication device 10 requests the user to re-register registered fingerprint information.

Furthermore, yet another arrangement is acceptable in which, in the case where a plurality of fingerprint authentication results each of which has been obtained based on the initial input of an input fingerprint image indicate that the authentication processes have failed in a row, the fingerprint authentication device 10 requests the user to re-register registered fingerprint information.

Moreover, yet another arrangement is acceptable in which, in the case where an overlapping area size that has been calculated based on the initial input of a fingerprint image is smaller than a specified area size, the fingerprint authentication device 10 requests the user to re-register registered fingerprint information.

The first through the fifth embodiments of the present invention are explained above. It is, however, possible to realize the present invention in various embodiments other than the exemplary embodiments described above. Thus, in the following sections, other embodiment examples will be explained as a sixth embodiment.

With respect to the fingerprint image input unit, for instance, the present invention is not limited to the example of the fingerprint image input unit described above. It is possible to apply any other elements and devices to the present invention, as long as the element or the device is able to obtain a fingerprint in the form of an image. For example, the fingerprint image input unit may be configured with a plane-type fingerprint sensor or a sweep-type fingerprint sensor. Further, the fingerprint detection method used by the fingerprint image input unit may be, for example, any of the following: a capacitance method, a heat sensor method, an electric field method, and an optical method.

With respect to configurations of the devices and the like, unless otherwise noted, it is possible to apply an arbitrary modification to any of the processing procedures, the controlling procedures, the specific names, and the information including the various types of data and parameters (e.g., the stored information depicted in FIG. 15 and the specified threshold values) that are presented in the description above and the drawings.

Further, the constituent elements of the devices that are depicted in FIGS. 2, 6, 11, and 13 are based on the functional concepts. Thus, the constituent elements do not necessarily have to be physically configured as depicted in the drawings. In other words, the specific mode of distribution and/or integration of each of the fingerprint authentication devices is not limited to the examples depicted in the drawings. It is acceptable to configure each of the devices by functionally or physically distributing or integrating any arbitrary unit thereof, according to various types of loads and the status of use. For example, it is acceptable to configure a device by integrating the fingerprint image input unit 1 and the fingerprint information generating unit 31 together.

Furthermore, all or any arbitrary part of the processing functions that are implemented by the fingerprint authentication device 10 may be realized by a CPU (central processing unit) or through computer programs (hereinafter, "programs") that are analyzed and executed by the CPU or may be realized as hardware using wired logic.

The various types of processes that are performed by the fingerprint authentication device 10 and are explained in the description of the first through the fifth embodiments above may be realized by causing a computer system such as a personal computer or a work station to execute programs that are prepared in advance.

Figure 16:
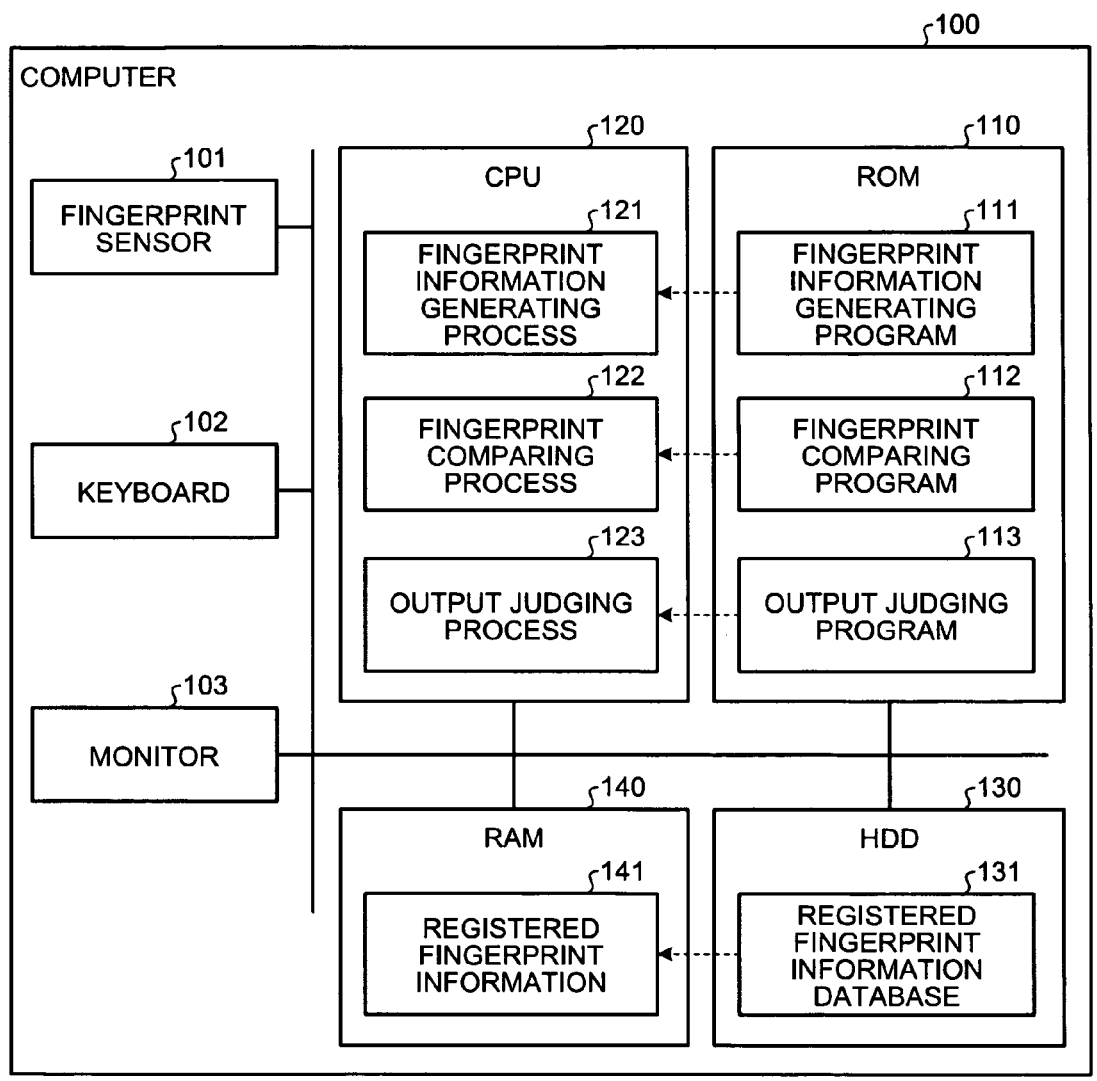
FIG. 16 is a drawing of a computer that executes a fingerprint authentication program.

Accordingly, in the following sections, an example of a computer that executes a fingerprint authentication computer program (hereinafter, the "fingerprint authentication program") that has the same functions as those of the fingerprint authentication device 10 described in the first embodiment above will be explained, with reference to FIG. 16. FIG. 16 is a diagram of a computer that executes the fingerprint authentication program.

As depicted in FIG. 16, a computer 100 serving as the fingerprint authentication device 10 is configured so that a fingerprint sensor 101, a keyboard 102, a monitor 103, a ROM (read-only memory) 110, a CPU 120, an HDD (hard disk drive) 130, and a RAM (random access memory) 140 are connected to one another via a bus. The fingerprint sensor 101 corresponds to the fingerprint image input unit 1, whereas the keyboard 102 corresponds to the user identification information input unit 2. Further, the monitor 103 corresponds to the output unit 3.

The ROM 110 stores therein, in advance, a fingerprint authentication program that achieves the same functions as those of the fingerprint authentication device 10 explained in the first embodiment above. In other words, as depicted in FIG. 16, the ROM 110 stores therein, in advance, a fingerprint information generating program 111, a fingerprint comparing program 112, and an output judging program 113. It is also acceptable to distribute or integrate any of the programs 111 to 113, as necessary, like the constituent elements of the fingerprint authentication devices 10 depicted in FIGS. 2, 6, 11, and 13.

When the CPU 120 reads the programs 111 to 113 from the ROM 110 and executes the read programs, the programs 111 to 113 function as a fingerprint information generating process 121, a fingerprint comparing process 122, and an output judging process 123, as depicted in FIG. 16. The processes 121 to 123 correspond to the fingerprint information generating unit 31, the fingerprint comparing unit 32, and the output judging unit 33, respectively, that are depicted in FIGS. 2, 6, 11, and 13.

Further, as depicted in FIG. 16, the HDD 130 is configured so as to include a registered fingerprint information database 131. The CPU 120 reads registered fingerprint information 141 out of the registered fingerprint information database 131 and stores the read registered fingerprint information 141 into the RAM 140. The CPU 120 then executes processes based on the registered fingerprint information 141 that has been stored in the RAM 140. It should be noted that the registered fingerprint information 141 corresponds to the registered fingerprint information storage unit 21 depicted in FIGS. 2, 6, 11, and 13.

The programs 111 to 113 described above do not necessarily have to be stored in the ROM 110 in advance. For example, another arrangement is acceptable in which the programs are stored in a "portable physical medium" to be inserted into the computer 100, such as an FD (flexible disk), a CD-ROM (compact disk read-only memory), a DVD (digital versatile disk), an MO (magneto-optical) disk, or an IC (integrated circuit) card, or a "fixed physical medium" that is provided on the inside or the outside of the computer 100 such as an HDD, or "another computer (or a server)" that is connected to the computer 100 via a public circuit, the Internet, a LAN (local area network), or a WAN (wide area network), so that the computer 100 reads the programs from the medium or the other computer (or the server) and executes the read programs.

Based on the fingerprint authentication device 10 explained in the first embodiment above, it is possible to realize a fingerprint authentication method that includes: an authentication success/failure judging step (see, for example, Steps S104 and S105) of judging whether a fingerprint authentication process has successfully been performed, based on a comparison result obtained by comparing input fingerprint information generated from a fingerprint image that has been input through a fingerprint sensor with registered fingerprint information that has been registered in advance; an overlapping area size obtaining step (see, for example, Step S201) of obtaining, in the case where an authentication result indicating that the authentication process has failed has been obtained, an overlapping area size corresponding to the time when the input fingerprint information and the registered fingerprint information overlap each other the most; a requestability judging step (see, for example, Step S204) of judging whether the user should be requested to re-input an input fingerprint image by using the obtained overlapping area size and a similarity level indicating a matching degree between the input fingerprint information and the registered fingerprint information corresponding to the time when these two pieces of information overlap each other the most; and a re-input requesting step (see, for example, Step S109) of requesting the user to re-input an input fingerprint image in the case where a judgment result indicating that the user should be requested to re-input an input fingerprint image has been obtained.

According to the embodiments disclosed above, it is possible to reduce the time and effort required from the user during the fingerprint authentication process by preventing the situation where the user is requested to re-input a fingerprint image in vain.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A fingerprint authentication device comprising:
    an authentication success/failure judging unit that judges whether a fingerprint authentication process has successfully been performed, based on a comparison result obtained by comparing input fingerprint information generated from a fingerprint image input through a fingerprint sensor with registered fingerprint information registered in advance;
    an overlapping area size obtaining unit that, in a case where the authentication success/failure judging unit has obtained an authentication result indicating that the fingerprint authentication process has failed, obtains an overlapping area size corresponding to a time when the input fingerprint information and the registered fingerprint information overlap each other the most;
    a requestability judging unit that judges whether a re-input of the input fingerprint image is to be requested, by using the overlapping area size obtained by the overlapping area size obtaining unit and a similarity level that indicates a matching degree between the input fingerprint information and the registered fingerprint information corresponding to the time when the input fingerprint information and the registered fingerprint information overlap each other the most; and
    a re-input requesting unit that requests the re-input of the input fingerprint image in a case where the requestability judging unit has obtained a judgment result indicating that the re-input of the input fingerprint image is to be requested.

2. The fingerprint authentication device according to claim 1, wherein
    the overlapping area size obtaining unit obtains, as the overlapping area size, a size of an area in which the input fingerprint information generated from a fingerprint image and the registered fingerprint information overlap each other corresponding to a time when an evaluation value is highest, the evaluation value being a value that correlates with the similarity level while a pattern matching method is being used, and
    the requestability judging unit judges that the re-input of the input fingerprint image is to be requested on condition that the overlapping area size is smaller than a predetermined threshold value, and the evaluation value corresponding to the time when the input fingerprint information generated from a fingerprint image and the registered fingerprint information overlap each other the most satisfies a predetermined threshold value.

3. The fingerprint authentication device according to claim 1, wherein
    the overlapping area size obtaining unit obtains, as the overlapping area size, a size of an area in which the input fingerprint information generated from a fingerprint image and the registered fingerprint information overlap each other corresponding to a time when the input fingerprint information and the registered fingerprint information are caused to overlap each other in such a manner that positions of corresponding minutiae that are contained in both the input fingerprint information and the registered fingerprint information in an overlapping manner match each other, and
    the requestability judging unit converts the similarity level to a converted similarity level corresponding to a time when the input fingerprint information and the registered fingerprint information completely overlap each other, by using a ratio of the overlapping area size to an area size of the registered fingerprint information and judges that the re-input of the input fingerprint image is to be requested on condition that the converted similarity level obtained as a result of the converting satisfies a predetermined threshold value.

4. The fingerprint authentication device according to claim 1, wherein the re-input requesting unit requests the re-input of the input fingerprint image while outputting a fingerprint image inputting method for inputting the fingerprint image that makes the overlapping area size larger.

5. The fingerprint authentication device according to claim 4, wherein the re-input requesting unit requests the re-input of the input fingerprint image while outputting the fingerprint image inputting method that indicates a positional relationship between the input fingerprint information and the registered fingerprint information corresponding to the time when the input fingerprint information and the registered fingerprint information overlap each other the most.

6. The fingerprint authentication device according to claim 4, wherein the re-input requesting unit requests the re-input of the input fingerprint image while outputting the fingerprint image inputting method that indicates how to move a finger.

7. The fingerprint authentication device according to claim 1, wherein the authentication success/failure judging unit judges whether the fingerprint authentication process has successfully been performed, based on the comparison result obtained by comparing the input fingerprint information with the registered fingerprint information that has been specified out of all registered fingerprint information.

8. The fingerprint authentication device according to claim 1, wherein
    the authentication success/failure judging unit judges whether the fingerprint authentication process has successfully been performed for each of pieces of identification information that are uniquely assigned to the registered fingerprint information, respectively, and
    the fingerprint authentication device further comprises a priority order assigning unit that, in a case where the authentication success/failure judging unit has obtained an authentication result indicating that the fingerprint authentication process has failed for each of all the pieces of identification information, assigns a priority order number to each of the pieces of identification information, the priority order number corresponding to a priority order in which the re-input of the fingerprint image is requested, and wherein every time a judgment result indicating that the re-input of the input fingerprint image is not requested has been obtained, the requestability judging unit judges whether the re-input of the input fingerprint image is requested, by using the overlapping area size and the similarity level that correspond to one of the pieces of identification information that has a next highest priority order after another one of the pieces of identification information referred to in an immediately-preceding judging process.

9. The fingerprint authentication device according to claim 8, wherein the priority order assigning unit assigns the priority order number to each of the pieces of identification information in such a manner that the higher the similarity level is, the higher the priority order is.

10. The fingerprint authentication device according to claim 9, wherein the priority order assigning unit assigns the priority order number to each of the pieces of identification information selected out of all the pieces of identification information, in descending order of similarity levels thereof.

11. The fingerprint authentication device according to claim 8, wherein the priority order assigning unit assigns the priority order number to each of the pieces of identification information in such a manner that the larger the overlapping area size is, the higher the priority order is.

12. The fingerprint authentication device according to claim 11, wherein the priority order assigning unit assigns the priority order number to each of the pieces of identification information selected out of all the pieces of identification information, in descending order of overlapping area sizes thereof.

13. The fingerprint authentication device according to claim 1, further comprising a re-registration requesting unit that requests a re-registration of the registered fingerprint information, in a case where the authentication success/failure judging unit has obtained an authentication result indicating that the fingerprint authentication process has successfully been performed, based on a comparison result obtained by comparing the input fingerprint information that has been re-input with the registered fingerprint information.

14. The fingerprint authentication device according to claim 13, wherein the re-registration requesting unit requests the re-registration of the registered fingerprint information in a case where the overlapping area size obtained by the overlapping area size obtaining unit based on an initial input of the input fingerprint image is smaller than a predetermined threshold value.

15. The fingerprint authentication device according to claim 13, wherein the re-registration requesting unit requests the re-registration of the registered fingerprint information in a case where a request number-of-times value indicating how many times the re-input requesting unit has requested the re-input of the input fingerprint image has reached a predetermined value.

16. A computer implemented method for fingerprint authentication, the method comprising:
    judging whether a fingerprint authentication process has successfully been performed, based on a comparison result obtained by comparing input fingerprint information generated from a fingerprint image input through a fingerprint sensor with registered fingerprint information registered in advance;
    obtaining, in a case where an authentication result indicating that the fingerprint authentication process has failed is obtained, an overlapping area size corresponding to a time when the input fingerprint information and the registered fingerprint information overlap each other the most;
    judging, using a processor, whether a re-input of the input fingerprint image is to be requested, by using the obtained overlapping area size and a similarity level that indicates a matching degree between the input fingerprint information and the registered fingerprint information corresponding to the time when the input fingerprint information and the registered fingerprint information overlap each other the most; and
    requesting the re-input of the input fingerprint image in a case where a judgment result indicating that the re-input of the input fingerprint image is to be requested is obtained.

17. A non-transitory computer-readable recording medium that stores therein a computer program causing a computer to execute:
    judging whether a fingerprint authentication process has successfully been performed, based on a comparison result obtained by comparing input fingerprint information generated from a fingerprint image input through a fingerprint sensor with registered fingerprint information registered in advance;
    obtaining, in a case where an authentication result indicating that the fingerprint authentication process has failed is obtained, an overlapping area size corresponding to a time when the input fingerprint information and the registered fingerprint information overlap each other the most;
    judging whether a re-input of the input fingerprint image is to be requested, by using the obtained overlapping area size and a similarity level that indicates a matching degree between the input fingerprint information and the registered fingerprint information corresponding to the time when the input fingerprint information and the registered fingerprint information overlap each other the most; and
    requesting the re-input of the input fingerprint image in a case where a judgment result indicating that the re-input of the input fingerprint image is to be requested is obtained.

* * * * *